US012578310B2

(12) United States Patent (10) Patent No.: US 12,578,310 B2
Wodnicki et al. (45) Date of Patent: Mar. 17, 2026

(54) SYSTEM AND METHOD FOR HIGH-FREQUENCY IMAGING ARRAY

(71) Applicant: UNIVERSITY OF SOUTHERN CALIFORNIA, Los Angeles, CA (US)

(72) Inventors: Robert G. Wodnicki, Los Angeles, CA (US); Haochen Kang, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 326 days.

(21) Appl. No.: 18/030,051

(22) PCT Filed: Oct. 15, 2021

(86) PCT No.: PCT/US2021/055284
§ 371 (c)(1),
(2) Date: Apr. 3, 2023

(87) PCT Pub. No.: WO2022/082047
PCT Pub. Date: Apr. 21, 2022

(65) Prior Publication Data
US 2024/0019404 A1 Jan. 18, 2024

Related U.S. Application Data

(60) Provisional application No. 63/092,389, filed on Oct. 15, 2020.

(51) Int. Cl.
*G01N 29/22* (2006.01)
*G01N 29/28* (2006.01)

(52) U.S. Cl.
CPC ......... *G01N 29/222* (2013.01); *G01N 29/221* (2013.01); *G01N 29/225* (2013.01);
(Continued)

(58) Field of Classification Search
CPC .. G01N 29/222; G01N 29/221; G01N 29/225; G01N 29/28; G01N 2291/02466;
(Continued)

(56) References Cited

U.S. PATENT DOCUMENTS 10,325,768 B1 6/2019 Stearns
10,724,889 B2 7/2020 Knapp et al.
(Continued)

FOREIGN PATENT DOCUMENTS

WO WO 2018/200995 11/2018
WO WO-2018200995 A2 * 11/2018 ............ C12M 41/46

OTHER PUBLICATIONS

International Search Report and Written Opinion (mailing date Feb. 10, 2022) for International PCT Patent Application No. PCT/US2021/055284, filed Oct. 15, 2021.

*Primary Examiner* — Xin Y Zhong
(74) *Attorney, Agent, or Firm* — Snell & Wilmer LLP

(57) ABSTRACT

A system and method for imaging biological material is disclosed. The imaging system may comprise: a multi-well assay plate having a plurality of wells, each well of the plurality of wells defining a cavity that is configured to hold a biological material; an imaging module having a plurality of transducers; and a processor coupled to the imaging module. The processor may be configured to: activate the plurality of transducers to emit energy within the plurality of wells to stimulate the biological material, and generate an image of or analyze the biological material within each well. The method may comprise: adding a thin layer of acoustic coupling material; inserting the microwell plate into a support frame of an enclosure; mechanically translating the support frame; interrogating each of the wells of the microwell plate with ultrasound; and outputting results of the interrogation to an output device.

23 Claims, 17 Drawing Sheets

(52) U.S. Cl.
CPC ... *G01N 29/28* (2013.01); *G01N 2291/02466* (2013.01); *G01N 2291/106* (2013.01)

(58) Field of Classification Search
CPC ........... G01N 2291/106; G01N 29/024; G01N 29/0672; G01N 29/07
See application file for complete search history.

(56) References Cited

U.S. PATENT DOCUMENTS

| | | | |
|---|---|---|---|
| 2003/0005771 A1* | 1/2003 | Percin .................. | G01N 29/222 |
| | | | 73/627 |
| 2005/0142033 A1* | 6/2005 | Glezer .................. | B01L 3/5085 |
| | | | 422/400 |
| 2007/0053795 A1* | 3/2007 | Laugharn ................ | B01F 31/87 |
| | | | 73/644 |
| 2008/0056960 A1 | 3/2008 | Laugharn, Jr. et al. | |
| 2009/0254289 A1 | 10/2009 | Vivek et al. | |
| 2015/0037808 A1* | 2/2015 | Donaty .................. | B01F 31/87 |
| | | | 435/6.19 |

* cited by examiner

300

325

320

310

300

325

320

310

900

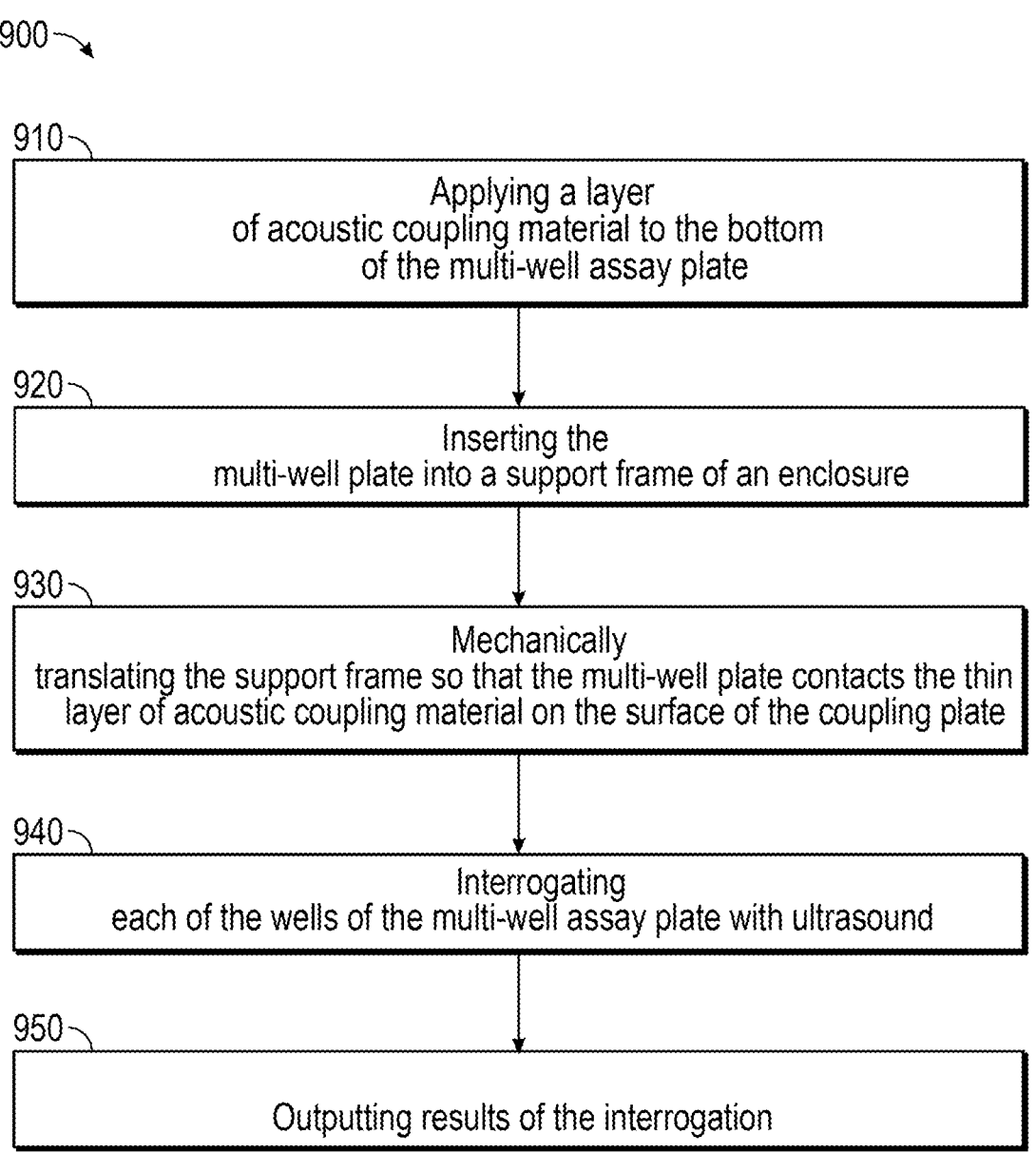

910 — Applying a layer
of acoustic coupling material to the bottom
of the multi-well assay plate 920 — Inserting the
multi-well plate into a support frame of an enclosure 930 — Mechanically
translating the support frame so that the multi-well plate contacts the thin
layer of acoustic coupling material on the surface of the coupling plate 940 — Interrogating
each of the wells of the multi-well assay plate with ultrasound 950 — Outputting results of the interrogation

Interposer
1030

1020
Transducer Element
Assembly

Routing
Substrate
1040

SYSTEM AND METHOD FOR HIGH-FREQUENCY IMAGING ARRAY

PRIORITY CLAIM

This application claims priority to U.S. provisional patent application No. 63/092,389, titled "High-Frequency Imaging Array", filed Oct. 15, 2020. The '389 disclosure is incorporated here by reference in its entirety for all purposes.

FIELD

This disclosure generally relates to system and method for imaging biological materials in a multi-well assay plate, and more particularly, to ultrasound imaging of biological materials in a multi-well assay plate with an imaging module.

BACKGROUND

For new drug-discovery it is important to evaluate the efficacy of potential drug candidates in suitable in-vivo models. Historically this has been done using mouse models either through genetically modified animals or by xenografts of human tissue. This process for pre-clinical testing of drug candidates can be time-consuming due to the need to evaluate the agents in a large cohort of animals and over multiple generations to obtain statistically significant data. Another important challenge with pre-clinical trials using traditional in-vivo models is that they are not always indicative of the behavior of the therapeutic agent in human tissues. This problem has led to the development of in-vitro models of human organs using embryonic stem cells which display realistic micro-anatomy and analogous behavior to actual human organ systems. These micro-scale and simplified structures are called organoids and have been used to model disease states which affect the brain, the digestive system, and the liver among others.

An important aspect of pre-clinical research with living organisms is imaging for observation of morphological changes over time in response to the therapeutic agent under study. In the prior art there exist a number of imaging techniques and systems for obtaining single plane and volume acquisitions at the macro and micro-scalar level. These include such non-invasive optical sectioning microscopy methods as confocal or multiphoton laser scanning microscopy as well as light-sheet fluorescence microscopy (LSFM). These methods obtain 3D volumes by scanning a thin axially focused imaging plane through multiple sections of the imaged tissue and thereby reproducing the complete 3D volume. An important distinguishing feature of these systems is that they are fundamentally limited in their ability to produce real-time volumetric images due to the fact that the imaging sections are scanned mechanically. This can be done either by mechanically translating the specimen stage in the axial direction (e.g. for confocal microscopy) or by scanning the laser light sheet in an LSFM type system using a translating mirror. These systems also have a limited axial depth of field which varies inversely with the frame-rate. Imaging larger depth samples requires long acquisition times due to the mechanically translated optical image focal planes. This precludes the option of obtaining high optical resolution for larger structures that are moving in real-time.

Therefore, the use of these systems in pre-clinical imaging either for standard mouse-models or for newer organoid-based models for real-time volumetric imaging at micro-scalar levels with reasonable depth of field is challenging due to the limited penetration of light in tissue as well as the time-consuming mechanical scanning process.

Therefore, there exists a need for volumetric imaging systems operating at fine resolution and capable of producing real-time in-vivo datasets of macro-scalar structures such as tissue organoids in an efficacious and timely manner.

SUMMARY

In an example embodiment, an imaging system is disclosed. The imaging system may comprise: a multi-well assay plate having a plurality of wells, each well of the plurality of wells defining a cavity that is configured to hold a biological material; an imaging module having a plurality of transducers; and a processor coupled to the imaging module and configured to: activate the plurality of transducers to emit energy within the plurality of wells to stimulate the biological material, and generate an image of or analyze the biological material within each well.

In another example embodiment, a method for acoustically coupling a multi-well plate to an imaging module is disclosed. The method may comprise: adding a thin layer of acoustic coupling material across a surface of a coupling plate that is acoustically coupled to an imaging module; inserting the microwell plate into a support frame of an enclosure; mechanically translating the support frame so that the microwell plate contacts the thin layer of acoustic coupling material on the surface of the coupling plate; interrogating each of the wells of the microwell plate with ultrasound to determine whether uniform acoustic coupling exists; and outputting results of the interrogation to an output device.

BRIEF DESCRIPTION OF DRAWINGS

A more complete understanding of the present disclosure may be derived by referring to the detailed description and claims when considered in connection with the Figures, wherein like reference numbers refer to similar elements throughout the Figures, and:

FIG. 9 is an example flow diagram illustrating an exemplary method(s) for imaging the contents of a multi-well assay plate, in accordance with various embodiments;

DETAILED DESCRIPTION

Figure 1:
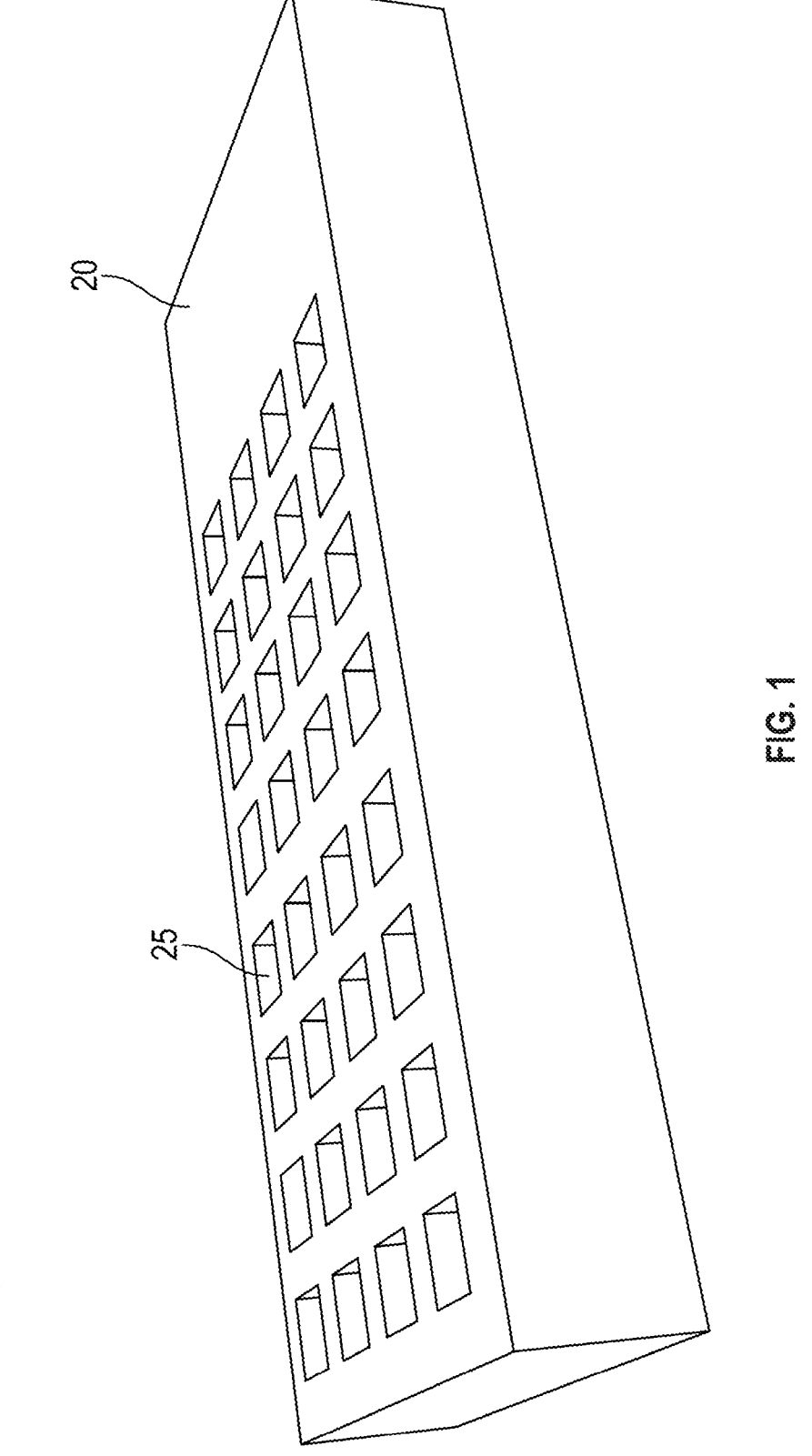
FIG. 1 is a prior art multi-well assay plate.

In accordance with various example embodiments, an imaging system is provided. The imaging system may comprise: a multi-well assay plate having a plurality of wells, each well of the plurality of wells defining or having a cavity that is configured to hold or store biological material; an imaging module having a plurality of transducers; and a processor coupled to the imaging module. In an example embodiment, the processor is configured to: activate the plurality of transducers to emit energy within the plurality of wells to stimulate the biological material, and generate an image of or analyze the biological material within each well.

In accordance with various example embodiments, an imaging system is configured to provide volumetric imaging operating at fine resolution and capable of producing real-time in-vivo datasets of macro-scalar structures such as tissue organoids in an efficacious and timely manner. In an example embodiment, volumetric high frequency ultrasound may provide real-time volumetric imaging of macro-scalar biological subjects such as organoids and mice with fine resolution. However, there are some limitations with ultrasound that until now have limited its use in an application such as disclosed herein.

Axial and lateral resolution in ultrasound are determined by the wavelength of the imaging system with clinical imaging occurring in the range of 1-10 MHz for an axial resolution of between 1.5 mm and 150 μm. Systems for ophthalmology and small animal imaging in vivo operate in the range of 10-50 MHz (150 μm to 30 μm resolution). And imaging at the tissue and cellular level can be done using systems operating in the range of 50-200 MHz (30 μm to 7.5 μm resolution). Typical ultrasound systems acquire single cross-sectional image planes parallel to the axial imaging direction. These can be used to build up volumetric images by mechanically translating the imaging scan head or probe. Electronically scanned two-dimensional arrays of ultrasound transducers can be further used to create volumetric image datasets that are acquired at high frame-rates (10-100 fps) in real-time. Such volume imaging arrays have become more standard in the clinical imaging space in the last 10-15 years for imaging the fetus in the womb and for echocardiographic studies.

In ultrasound, while the imaging resolution is related to the wavelength of the operating frequency, the pitch between transducer elements in an array is directly related to the wavelength as well. Linear arrays, producing axial image slices typically have λ-pitch element spacing, while 2D arrays which can produce volumetric datasets require λ/2-pitch element spacing. Recent advances in electronics miniaturization and packaging and assembly as well as novel ultrasound transducer technologies have made possible the dense integration of fine pitch elements enabling 2D arrays to be fabricated at λ/2-pitch for frequencies above 5 MHz. These have been used for example for intracardiac and transesophageal echocardiography (TEE) 3D volumetric imaging in real-time (so-called 4D imaging). While these systems can produce fine images at the macro-scalar level for observation of tissues in vivo they are not yet suitable for imaging at higher frequencies required for cellular level resolution.

A further requirement for high-throughput analysis of large cohort studies is an imaging assembly capable of interrogating and acquiring datasets for multiple different specimens either simultaneously or in quasi-real-time and compiling all of this information for the user. Current systems consist of single array probes which must be used sequentially on each of the specimens in turn which for a large cohort can be extremely time-consuming and therefore limits the amount of statistical data that can be obtained in a reasonable period of time.

With reference now to FIG. 1, a prior art multi-well assay plate 20 may comprise a plurality of well-cavities (e.g. 25). In each well-cavity 25 a biological material may be situated. In an example embodiment, a biological material may be an organoid, or any other suitable biological material. Such multi-well assay plates 20, are configured in standard sizes for insertion into various systems for analysis of the contents of the well-cavities. The multi-well assay plate 20 has played an important role in imaging of macro-scalar tissue constructs with micro-scalar resolution and has provided datasets for monitoring of efficacy of drug candidates as part of pre-clinical assessment. These devices consist of an array of small holes or wells which have been created in a solid carrier plate. The individual wells each hold a test subject consisting of biological tissues, and different therapeutic agents and concentrations (or other parameters) are varied from well to well. In this way a study of the effects of different reaction parameters may be efficiently conducted.

The multi-well assay plate of FIG. 1 is filled with the biological test tissues as well as reactive agents and then loaded into a test apparatus which conducts the experiment and further interrogates the results of the experiment for each of the respective wells. This evaluation may, for example, be an enzyme-linked immunosorbent assay (ELISA), or a fluorescence assay for detecting the presence or absence of a reaction at each of the respective microwells.

In the study of cancer biology and specifically the inhibition of proliferation of cancerous cells by specifically engineered therapeutic agents, the three-dimensional morphology of the tissue growth over time can be an important indicator of drug efficacy. One way to track the growth of these tissues over time for in-vivo animal models is using ultrasound scanning. For in vitro analysis of tissue organoids, it would be advantageous to be able to combine the advantages of ultrasound scanning for tissue tracking with the convenience of the multi-well assay plate for efficient large cohort in vitro studies.

Figure 2:
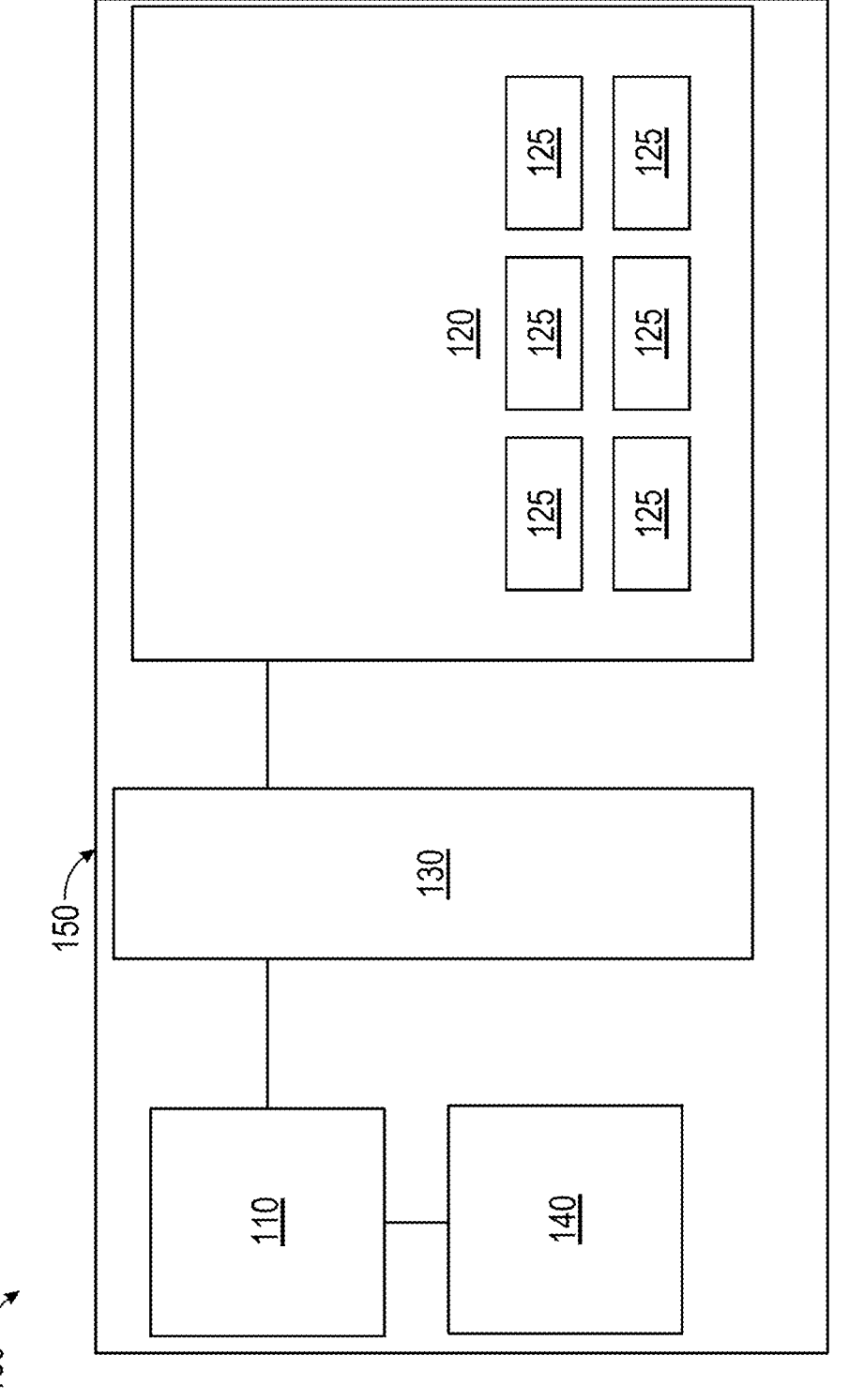
FIG. 2 is a schematic drawing of an example imaging system in accordance with various embodiments.

With reference now to FIG. 2, an imaging system 100 is provided. Imaging system 100 may comprise an imaging module 110, and a multi-well assay plate 120. In an example embodiment, the multi-well assay plate 120 further comprises a plurality of wells (or well cavities) 125, each well of the plurality of wells defining or having a cavity that is configured to hold or store biological material. In one example embodiment, the well is configured to hold a biological material. In an example embodiment, the wells are lined with acoustically absorbing material. In an example embodiment, the imaging system 100 further comprises an acoustic coupling layer 130. In an example embodiment, the multi-well assay plate 120 comprises a two dimensional array of wells. In an example embodiment, the two-dimensional array of wells can be described as a two-dimensional matrix array of wells.

In an example embodiment, imaging module 110 is an acoustic/electronic module. In a first example embodiment, the imaging module 110 is an acoustic module comprising an array of acoustic transducers interfaced to the next level of the system using an array of wires. In second example embodiment, the imaging module 110 is an electronic module comprising an array of acoustic transducers interfaced to front-end electronics which in turn are interfaced to the next level of the system via an array of wires. The distinction between the first and second example embodiments is that without electronics the transducer density may be more coarse because it may be limited by the routing capability of the wiring. However, the addition of the electronics may be configured to introduce multiplexing functions which greatly reduces the number of wires that need to be connected back to the system and thereby allows the transducer count to be greatly increased and in turn the resolution to be improved.

In an example embodiment, the imaging module 110 comprises a plurality of transducers. In one example embodiment, the imaging module comprises high-resolution 2D modular arrays. In an example embodiment, the transducers may be configured to operate in the range of 10 MHz-300 MHz, preferably in the range of 30-200 MHz, more preferably in the range of 30-50 MHz. In an example embodiment, the imaging system 100 further comprises a processor 140 coupled to the imaging module. In an example embodiment, the processor 140 is configured to: activate the plurality of transducers to emit energy within the plurality of wells to stimulate the biological material, and generate an image of or analyze the biological material within each well.

In an example embodiment, the imaging system 100 may further comprise a power source coupled to the imaging module and configured to power the imaging module. In an example embodiment, the imaging system 100 may further comprise a memory configured to store image data or analyzed data. In an example embodiment, the imaging system 100 may further comprise a display configured to display the image.

In another example embodiment (not shown), imaging module 110 may be combined with acoustic coupling layer 130 and with multi-well assay plate 120 to create a modular "cassette" unit that is self-contained. This cassette unit can then be loaded into the larger system for analysis. In this example embodiment, the cassette unit may be interfaced to processor 140 through connectors which provide the power supply for 110 and also communicates data signals with imaging module 110. This example embodiment may be similar to that illustrated and described in connection with FIGS. 3A and 3B with the difference being that the transducer array(s) are not integrated with each well but instead are integrated with the entire well plate. For example, the cassette may comprise a mechanical scanning mechanism that forms part of the cassette.

Figure 3A:
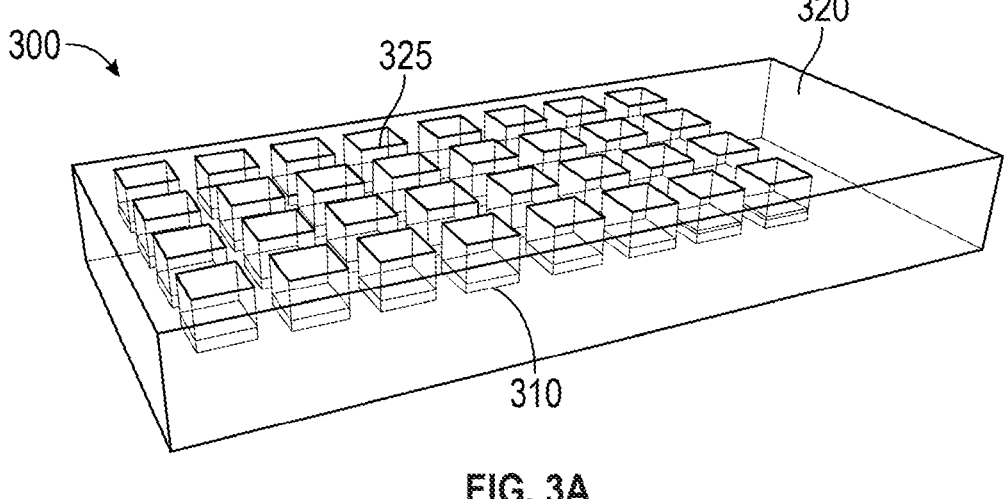
FIGS. 3A and 3B are perspective and side view drawings, respectively, of an example imaging system in accordance with various embodiments.
Figure 3B:
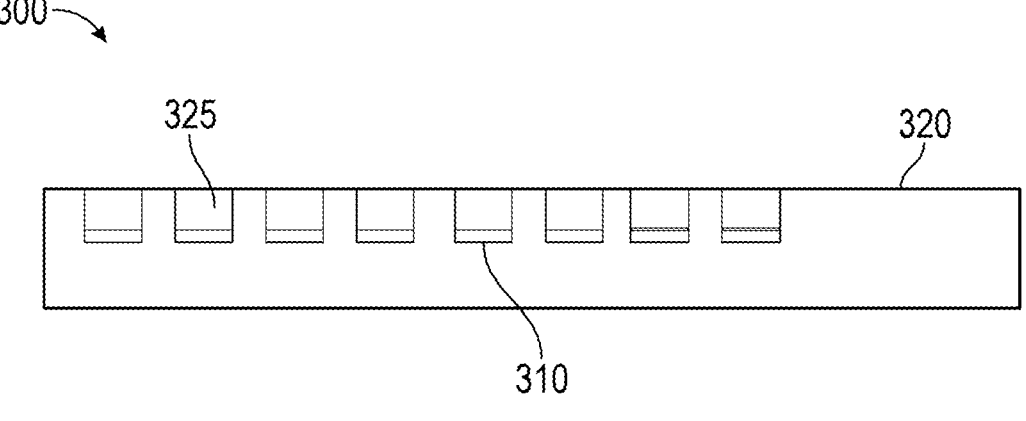

In an example embodiment, each well 125, of the plurality of wells, may be associated with a respective imaging module 110. With reference now to FIGS. 3A and 3B, an imaging system 300 comprises a multi-well assay plate 320 that comprises a plurality of well-cavities 325 and a plurality of imaging modules 310. In this example embodiment, the multi-well assay plate 320 is constructed with each imaging module 310 integrated in the multi-well assay plate 320. As illustrated in FIGS. 3A and 3B, the imaging modules 310 are coupled directly to the bottom of each well 325. In another example embodiment, the imaging modules 310 are integrated at the bottom of each cavity 325. In a further example embodiment, the imaging modules 310 are coupled to the bottom of each well 325 via an acoustic coupling layer (not shown). In an example embodiment, the imaging system 300 couples the respective imaging modules 310 to the well 325 such that they can create volumetric images of the respective tissues in the particular cavity.

In an example embodiment, the volumetric image data may be communicated to a data processing unit. The volumetric image data may be communicated, in one example embodiment, by direct electrical means, such as through electrical contacts from the imaging module to a processor, display and/or storage medium. In another example embodiment, the image data may be communicated using radio frequency (RF) signals. In yet another example embodiment, the image data may be communicated optically via optical encoding. For example, the imaging system may further comprise an acoustic window provided in a low-density wiring board associated with the acoustic module for communicating the ultrasound images from the sensor.

In accordance with a further example embodiment, the imaging system is configured to control the imaging module and/or power to the individual modular imaging arrays.

In a further example embodiment, the imaging system 300 is configured to enhance image quality by lining the sidewalls of the cavities with an acoustically damping material such as RTV Silicone to absorb spurious ultrasound reflections.

Figure 4A:
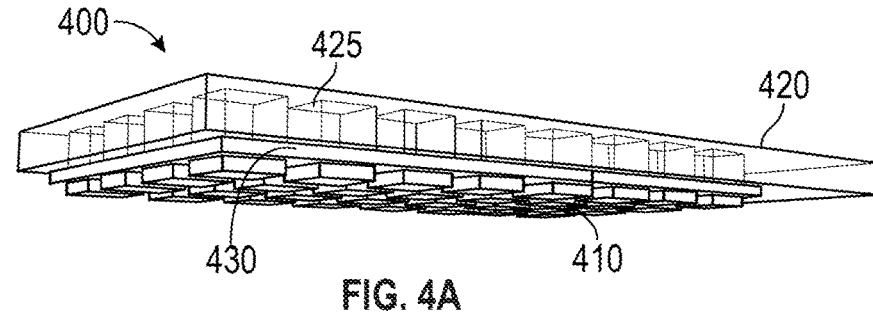
FIGS. 4A and 4B are perspective and side view drawings, respectively, of another example imaging system in accordance with various embodiments.
Figure 4B:
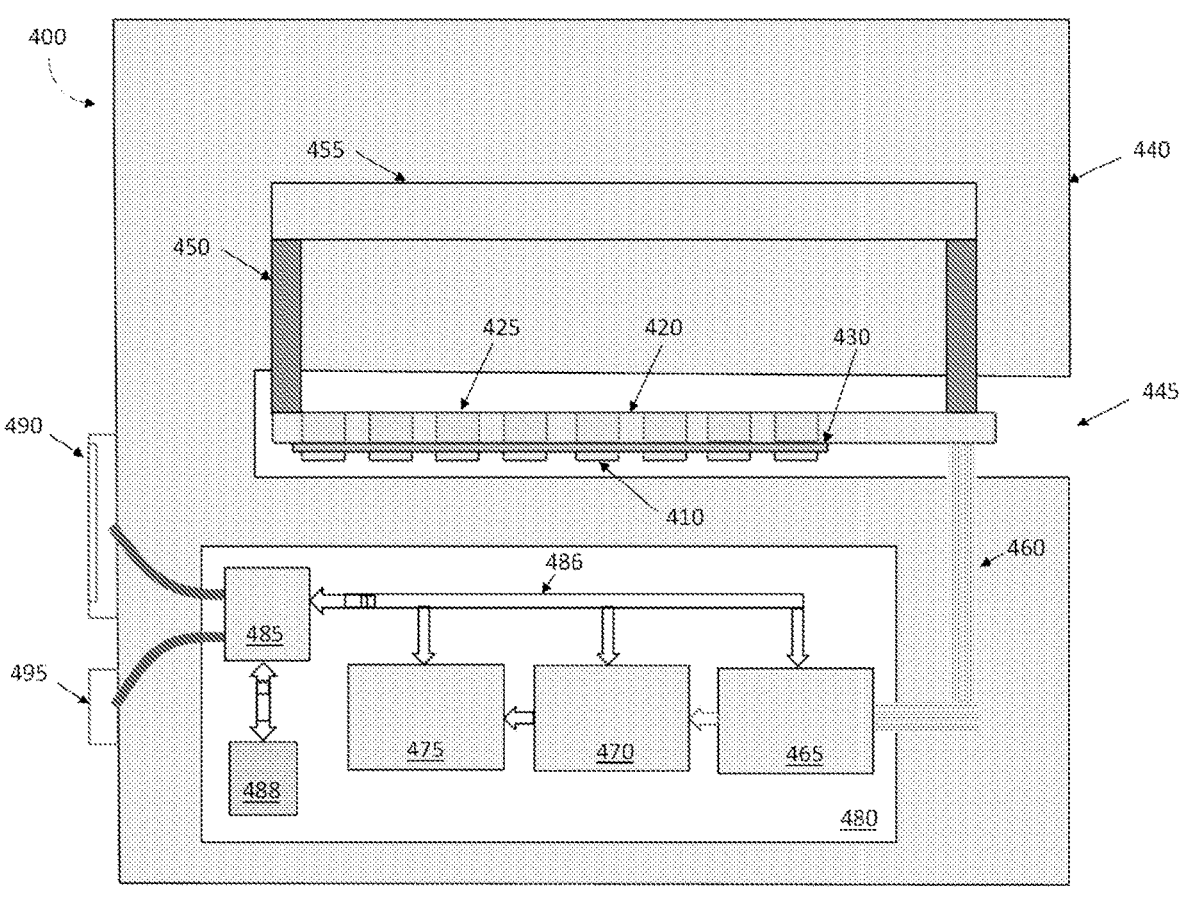

In accordance with other example embodiments, the imaging module 110 is not integrated in the multi-well assay plate 120. With reference now to FIGS. 4A and 4B, an example imaging system 400 comprises a multi-well assay plate 420 having a plurality of well-cavities 425. The system 400 may further comprise a plurality of imaging modules 410 and an acoustic coupling layer 430. In this example embodiment, the multi-well assay plate 420 is constructed with imaging modules 410 not integrated in the multi-well assay plate 420. Instead, imaging modules 410 are located under the multi-well assay plate 420 directly under the bottom of each cavity 425 with the acoustic coupling layer 430 in-between the cavity 425 and the imaging module 410. The imaging modules 410 are configured to create volumetric images of the respective tissues in the particular cavity. In accordance with one example embodiment, the acoustic coupling layer 430 is located on the bottom side, proximate the bottom side, of the multi-well assay plate 420. In accordance with another example embodiment (not shown), the acoustic coupling layer 430 is located within the multi-well assay plate 420 forming a portion of the bottom side of the multi-well assay plate 420.

In an example embodiment, the imaging modules 410 are coupled to the bottoms of the multi-well plate via an intervening acoustic coupling layer 430. In an example embodiment, the acoustic coupling layer 430 may have an acoustic impedance similar to that of water. In an example embodiment, the acoustic coupling layer 430 may advantageously consist of water, perfluorocarbon, or oil, but it may also be an acoustic coupling gel with similar acoustic impedance to water. In an example embodiment, the acoustic coupling material is maintained in a partially enclosed structure to create a bath of liquid into which the well plates may be lowered. Such intervening acoustic coupling bath may be configured to ensure highly efficient coupling of acoustic energy from the transducer arrays into the acoustic well plate. In an example embodiment, the system is configured to have highly efficient coupling to ensure little loss of signal at this interface which in turn allows for high frequency imaging of deeper tissues in the well plate and uniform high resolution within the structures. In an example embodiment, the acoustic coupling liquid may be maintained in a circulating liquid circuit to ensure replacement of evaporated material and also cleanliness, to prevent contamination of the imaged specimens. In a further example embodiment, the water bath may be heated to a suitable temperature for maintaining or accelerating biological reactions in the analyzed tissue. Conversely, in an example embodiment, the water may also be cooled to slow the rate of biological reactions in the tissue. In other example embodiments, the water bath circuit may also include structures for removing air bubbles which can be detrimental to uniform acoustic coupling and imaging.

In one example embodiment, the imaging system 400 may be configured to apply the acoustic coupling layer 430 to the bottom surface of the modular array elements prior to loading the multi-well plates into the system. In one example embodiment, the imaging system 400 further comprises a surrounding physical frame (not shown). The surrounding frame may be configured to apply pressure to the plate to secure the plates and ensure enough pressure for good physical contact of the plates to the acoustic coupling layer. In another embodiment of the invention, the plates themselves are prefabricated with the acoustic coupling layer already in place.

In an example embodiment, imaging system 400 may comprise a benchtop contained device that is designed to receive the micro-well assay plate 420 containing an array of biological test materials to be systematically analyzed. Imaging system 400 may comprise, for example, a frame positioning system (not enumerated) comprising a support frame 450 and positioning gantry 455. The support frame 450 and positioning gantry 455 may be configured to hold micro-well assay plate 420 securely and translate it as needed for the analysis. In an example embodiment, imaging system 400 further comprises enclosure 440. In an example embodiment enclosure 440 is a physical envelope designed to securely hold the sensitive internal components and protect them from external influence during operation.

In an example embodiment, imaging system 400 further comprises data processing unit 480 which accepts inputs from an operator, acquires data from the imaging module 410 and processes this data to generate results for the user. Data processing unit 480 may further comprise sensor interface unit 465, which acquires the data representing the contents of multi-well assay plate 420 via a signal cable harness assembly 460 and applies amplification and other signal processing to render the initial acquired dataset for further analysis. In an example embodiment, the data processing unit 480 may further comprise image generation unit 470. In an example embodiment, image generation unit 470 may be configured to processes the acquired and amplified signals from interface unit 465 to create image format datasets of the biological tissues in micro-well assay plate 420. In an example embodiment, data processing unit 480 may further comprise feature extraction unit 475, configured to process the image data. The feature extraction unit may further be configured to process the acquired image data to locate and quantify biologically significant features in the images which are used to generate statistical information related to the analysis and the study.

In an example embodiment, the data processing unit 480 may further comprise a control unit 485. Control unit 485, in an example embodiment, may be configured to direct the entire data processing operation by providing control inputs on bidirectional databus 486, to sensor interface unit 465, image generation unit 470, and feature extraction unit 475. Control unit 485 may further interface with data communication unit 488 which itself interfaces with a users' data store (not shown), e.g. over WiFi, USB, Ethernet or other known and future data communication protocols.

Control unit 485 may further interface with the user using system display unit 490 to provide real-time and time-critical feedback to the user (e.g. when analysis is done, when to load the well-plate, system operation error faults etc . . . ). Control unit 485 may further interface with the user using system control keys 495 which provide among other features, the user the ability to initiate the automated loading of multi-well assay plate 420, start the analysis and stop the operation in the event of a system fault and other important control features for general system operation. It can be appreciated that system display unit 490 and system control keys 495 may be co-integrated in the form of a touch display. Moreover data processing unit 480 may comprise any suitable system for controlling the imaging system 400, receiving data from the transducer(s) and generating output therefrom.

Figure 5:
FIG. 5 is a perspective view drawing of another example imaging system in accordance with various embodiments.

In a further example embodiment, and with reference to FIG. 5, an imaging system 500 may comprise a frame structure 560 and imaging modules 510 that are attached to the frame structure 560. In an example embodiment, the frame structure 560 holds the imaging module 510 above the multi-well assay plate 520 when the plate is loaded into an enclosure 150 (see FIG. 2). In an example embodiment, the frame structure 560 holds each the imaging module 510 directly above a corresponding well when the plate is loaded into the system. The action of clamping the plate into the system lowers the imaging modules 510 down into the liquid medium of each of the microwells, thereby efficiently coupling the transmitted ultrasound signal into the medium. In a further example embodiment, the imaging system 500 comprises a cleaning mechanism to sanitize the active surface of the imaging modules 510 prior to or after immersion in the medium in well-cavities 525.

Figure 6:
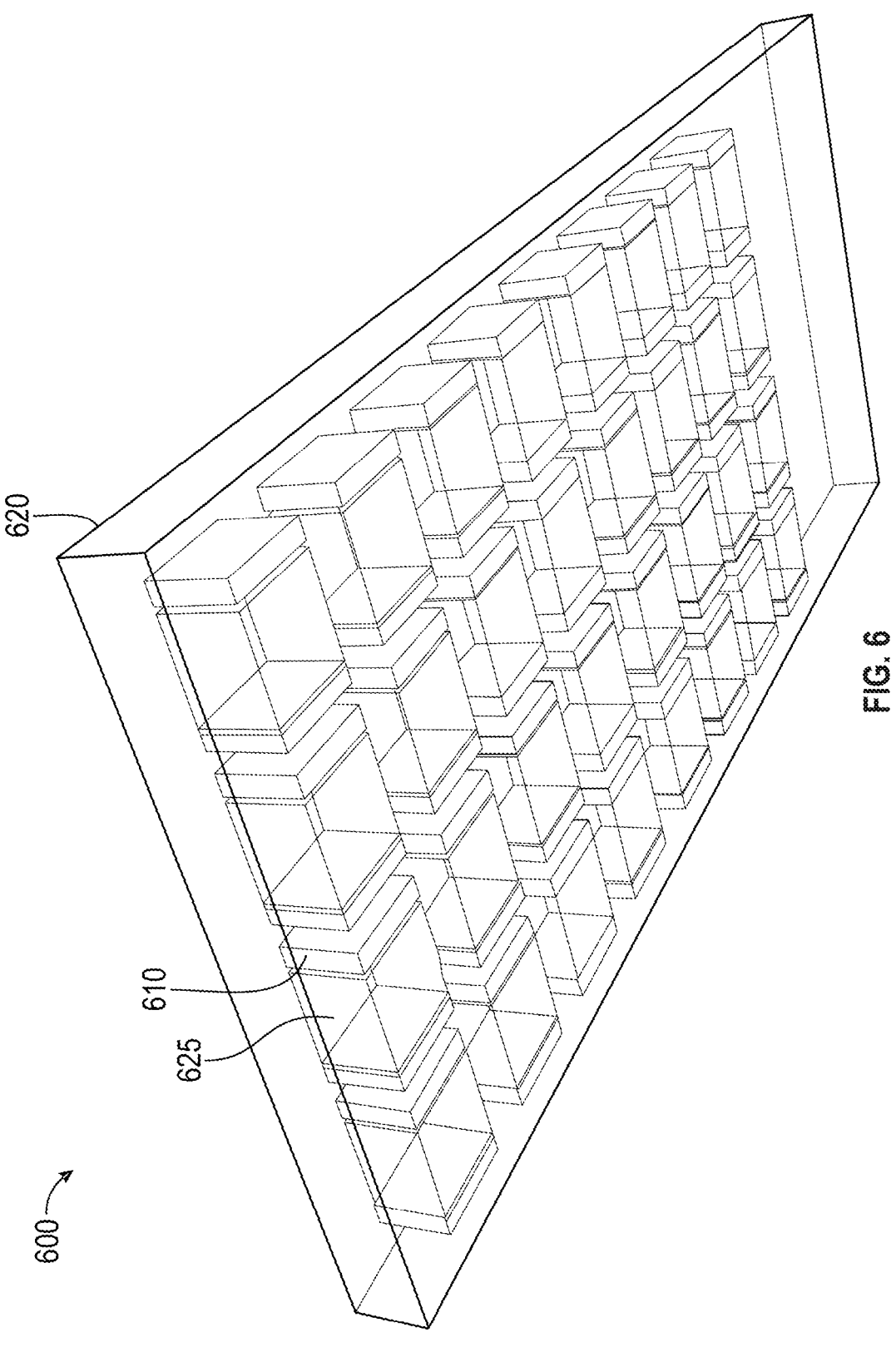
FIG. 6 is a perspective view drawing of another example imaging system in accordance with various embodiments.

In a further example embodiment, the imaging module 110 may comprise two or more imaging modules per well 125. Moreover, the imaging modules may be positioned to image the content of the wells from the sides of the well instead of from above or below the wells. With reference now to FIG. 6, in an example embodiment, an imaging system 600 may comprise a multi-well assay plate 620 comprising a plurality of wells 625. In an example embodiment, the imaging system further comprises two imaging modules 610 per well 625. Stated another way, each well 625 may have multiple imaging modules 610 distributed around them in order to increase the amount of volumetric data coverage that can be obtained for each well. In one example embodiment, each microwell 625 may have two opposing imaging arrays. Stated another way, the ultrasonic sensors are integrated in opposing pairs at the side-walls of each well 625. In an example embodiment, the two opposing imaging arrays may be synchronized for Speed of Sound through-transmission imaging. In another embodiment (not shown) all five faces of each microwell comprise imaging arrays, thereby enabling acoustic computed tomography to further increase the imaging resolution of the system.

Figures 7A, 7B:
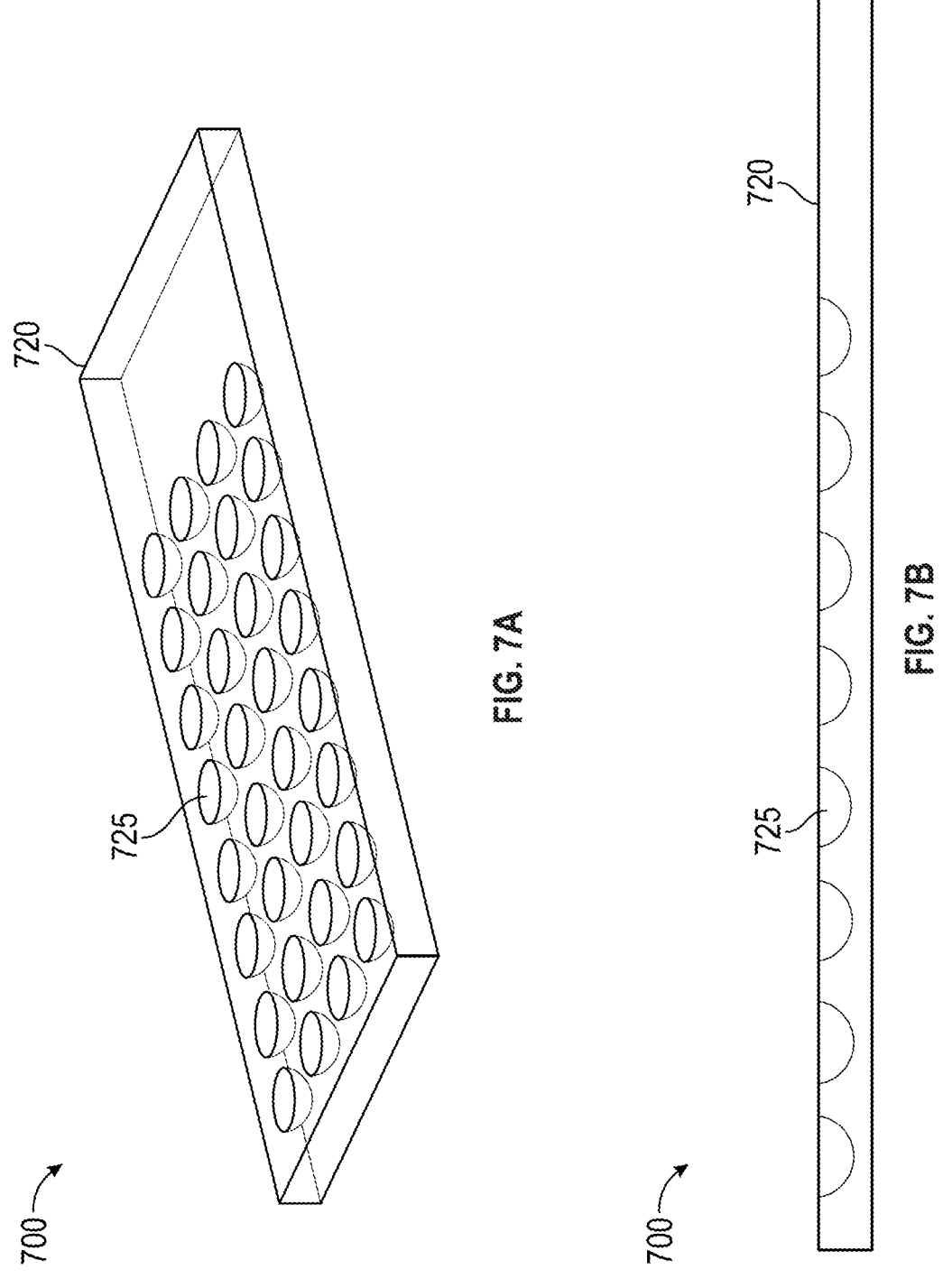
FIGS. 7A and 7B are perspective and side view drawings, respectively, of a prior art multi-well assay plate.
Figure 8A:
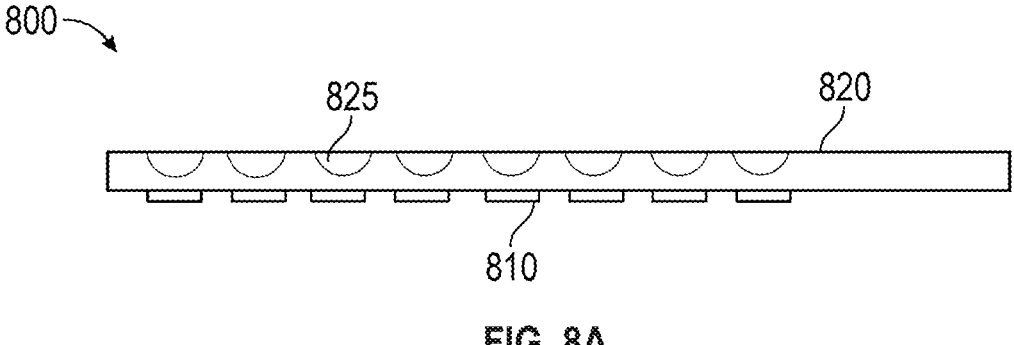
FIGS. 8A and 8B are side view drawings of another example imaging system in accordance with various embodiments.
Figure 8B:
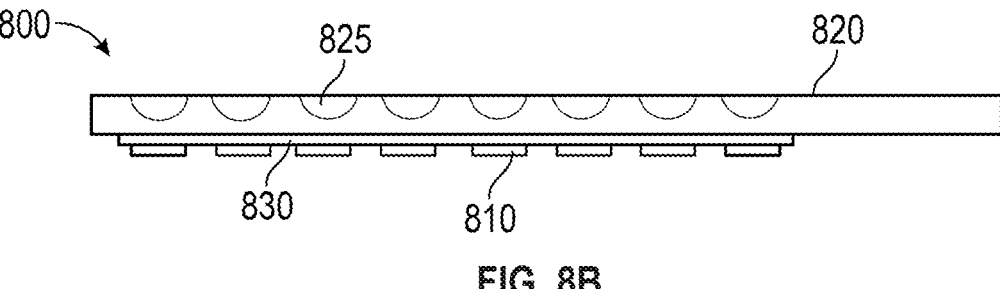
Figure 8C:
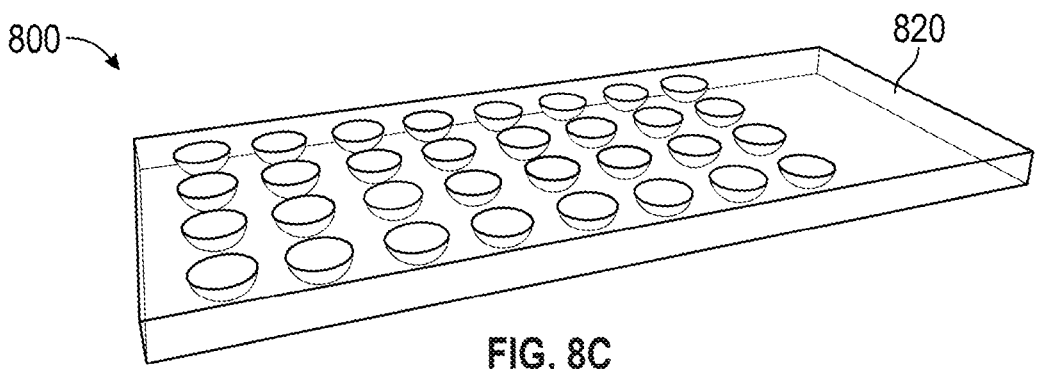
FIG. 8C is a perspective view drawing of another example imaging system in accordance with various embodiments.

It can be appreciated that the prior art microwell plates as illustrated in FIG. 1 may also comprise semi-spherical cavities as illustrated in FIGS. 7A and 7B, where the system 700 comprises a typical multi-well assay plate 720 having semi-spherical wells 725. For this case, the embodiments illustrated in FIGS. 3A-6, may be adapted as shown in FIGS. 8A, 8B, and 8C. With reference to FIGS. 8A, 8B, and 8C, an imaging system 800 may comprise a multi-well assay plate 820, having a plurality of wells 825. Wells 825 may be semi-spherical or hemispherical. Moreover, in accordance with other example embodiments, the wells can be cylindrical with round bottom, hexagonal, ellipsoid, or any suitable shape. In some example embodiments, the material of construction of the multi-well assay plate 820 has acoustic impedance similar to water. Representative materials in this regard include Polymethylpentene (TPX, Mitsui Chemicals, Japan) and thermoplastic elastomers (PBAX, Arkema, France) however any suitable material may be used for the plate 820. In an example embodiment, imaging system 800 may further comprise a plurality of imaging modules 810. In an example embodiment, each imaging module 810 is aligned with a respective well 825. In a further example embodiment imaging system 800 comprises an acoustic coupling layer 830. The acoustic coupling layer 830 may be connected between the respective imaging modules 810 and wells 825.

In a further example embodiment, as illustrated in connection with FIG. 8C, the well 825 may have a conformal imaging module 810, such that the system 800 comprises hemispherical microwells. In an example embodiment, the hemispherical wells comprise integrated ultrasound sensors. In an example embodiment, the hemispherical wells are constructed using modular arrays which are shaped to form concave structures. This can be accomplished for example by building the array elements on a flexible circuit or by low temperature annealing under pressure with a steel ball bearing form. Moreover, any suitable method of forming imaging modules 810 of hemispherical shape may be used.

In yet another example embodiment (not shown), the acoustic modules are mounted in a line across a bar that is mechanically translated either above, or below (or both) the microwells thereby interrogating one row of wells at a time electronically. In another example embodiment, the imaging system may be configured such that the imaging module includes a plurality of imaging modules that are arranged in a single row on a mechanical translating bar or head. In another example embodiment, the imaging system may comprise a linear array of ultrasonic elements. In this example embodiment, the processor may be configured to: cause the mechanical translating bar or head to slide, move or translate in one or more directions across a top plate. In this example embodiment, the top plate may comprise acoustically transparent protrusions that penetrate the top surface of a liquid medium when the plate is applied to the multi-well assay plate. Stated another way, the top plate may be coupled to a top surface of liquid medium within the plurality of wells to image the biological material within the plurality of wells when the plurality of imaging modules are activated. In this example, the plurality of ultrasonic transducers of each imaging module of the plurality of imaging modules are in a linear array and acoustically focused in elevation using a physical acoustic lens. In an example embodiment, an acoustic coupling layer disposed on the top surface of the top plate is configured to provide uniform acoustic coupling between the translating top acoustic array and the top plate, which in turn is acoustically coupled to the individual wells by physical contact of the acoustically transparent protrusions with the medium in each of the respective wells. This configuration may be advantageous due to the reduced required number of elements for interrogating the entire assay plate, but it also involves more moving parts and increased time to perform scans of all of the wells in the array, compared to other example embodiments without a translating bar.

In addition, in accordance with a further example embodiment, an imaging module may be configured to scan a single well, and be moveable across the array to scan each well in the array, in turn. Alternatively, the multi-well plate may be translated under the imaging module to scan each well in turn.

In a further example embodiment, the imaging system 100 may combine the ultrasound imaging process with other imaging processes to gather additional information about the tissues being analyzed. These additional imaging processes may include optical microscopic methods such as confocal or multiphoton laser scanning microscopy and light-sheet fluorescence microscopy (LSFM). Additionally, laser stimulation of the wells can be used to induce a photo-acoustic effect with the resulting acoustic signals being sampled by the modular 2D arrays. Moreover, the additional imaging process may include any suitable process. In an example embodiment, the information obtained can be presented to the user in interleaved or superimposed fashion with the morphological ultrasound data. Additional modes of operation of the ultrasound array may include elastographic methods for assessment of tissue stiffness as well as doppler imaging to assess flow.

Thus, in an example embodiment, the imaging system further comprises at least one of an optical imaging device, a laser configured to stimulate photoacoustic signals, a heating unit or a three-dimensionally (3D) printer. In a further example embodiment, the imaging system 100 is configured to provide heat to the microwell plate in order to sustain or increase the biological reactions therein. In a further example embodiment, the imaging system 100 is further configured as a 3D printer capable of performing additive manufacturing of biological tissues, wherein the volumetric ultrasound data is used to monitor and evaluate the progress of the printing operation for improved quality of the final results.

In a further example embodiment, ultrasonic stimulation is defined as providing High Intensity Focused Ultrasound (HIFU) and acoustic cell trapping through the ultrasound arrays for manipulation of the biological tissues in each of the wells in the multi-well assay plate. In an example embodiment, the walls of each well are configured to trap the energy emitted from the transducer(s).

In a further example embodiment, the imaging system may further comprise an enclosure having a lid that is movable between an open position and a closed position and is configured to receive the one or more multi-well assay plates when the lid is in the open position. In this example embodiment, the processor may be coupled to the multi-well assay plate when loaded in the enclosure. The processor may further be configured to: communicate with the imaging module using at least one of an electrical connection, a radio frequency device or an optical device; and analyze the image data created by the imaging module.

In a further embodiment the individual well-plates may be configured to have an imbedded optical, mechanical or electrically read unique serial number or code which identifies the specific well plate to the system for tracking analysis of the respective biological test material for the respective plate.

With reference now to FIG. 9, a method 900 may be configured to acoustically couple a microwell plate to an imaging module. As used herein microwell plate may be used interchangeably with multi-well assay plate. Moreover, as used herein microwell may be used interchangeably with well-cavity or well. In an example embodiment, method 900 may comprise applying a layer of acoustic coupling material to the bottom of the multi-well assay plate (step 910). In one example embodiment, the acoustic coupling material may be deposited, swept-on, sprayed-on, poured on, or put on a surface. The surface may be the bottom of the multi-well assay plate. In another example embodiment, where a coupling plate is between the imaging module and the top of the multi-well assay plate, the acoustic coupling material may be applied to the surface of the coupling plate on the side opposite the multi-well assay plate. In an example embodiment, the acoustic coupling material may be applied to the surface of the coupling plate in any suitable manner. In an example embodiment, method 900 may comprise inserting the multi-well assay plate into a support frame of an enclosure (step 920). The enclosure 150 may be configured to enclose various components of the imaging system 100. In an example embodiment, enclosure 150 may or may not enclose processor 140. In an example embodiment, enclosure 150 may further comprise mechanical structures to hold the various mechanical translating parts of the imaging system 100 (including, for example, micro-stepper motors for positioning the imaging modules relative to the specific wells). The enclosure 150 may further comprises a mechanical and electrical shielding super-surface that is fabricated from a suitable isolating material (e.g. aluminum, titanium, plastic, copper, or a combination of these). The enclosure 150 may further comprise electrical shielding (e.g. a Faraday Cage) to ensure low noise operation of the system 100. The enclosure 150 may further comprise a display screen providing status of the system's operation to the operator, as well as electrical input devices (E.G. a keyboard or buttons) to facilitate control of the system by the operator. The multi-well assay plate may be aligned within the enclosure to align with the transducer(s) of the imaging module.

In an example embodiment, method 900 may comprise mechanically translating the support frame so that the microwell plate contacts the thin layer of acoustic coupling material on the surface of the coupling plate (step 930). The mechanical translation may be caused by any suitable mechanical device, such as hydraulic, stepper motor, servo, or other suitable system for moving the multi-well assay plate into contact with the imaging module. In an example embodiment, method 900 may comprise interrogating each of the wells of the multi-well assay plate with ultrasound (step 940). In an example embodiment, the interrogation may be done to test whether uniform acoustic coupling exists. In another example embodiment, the interrogation may produce results useful for analyzing the content of the well cavities. In an example embodiment, method 900 may further comprise outputting results of the interrogation (950). The results may be output to any suitable data storage system. In another example embodiment, the results may be output to any suitable display system. The results may for example be ultrasound images of biological material in multi-well assay plate.

Figure 10:
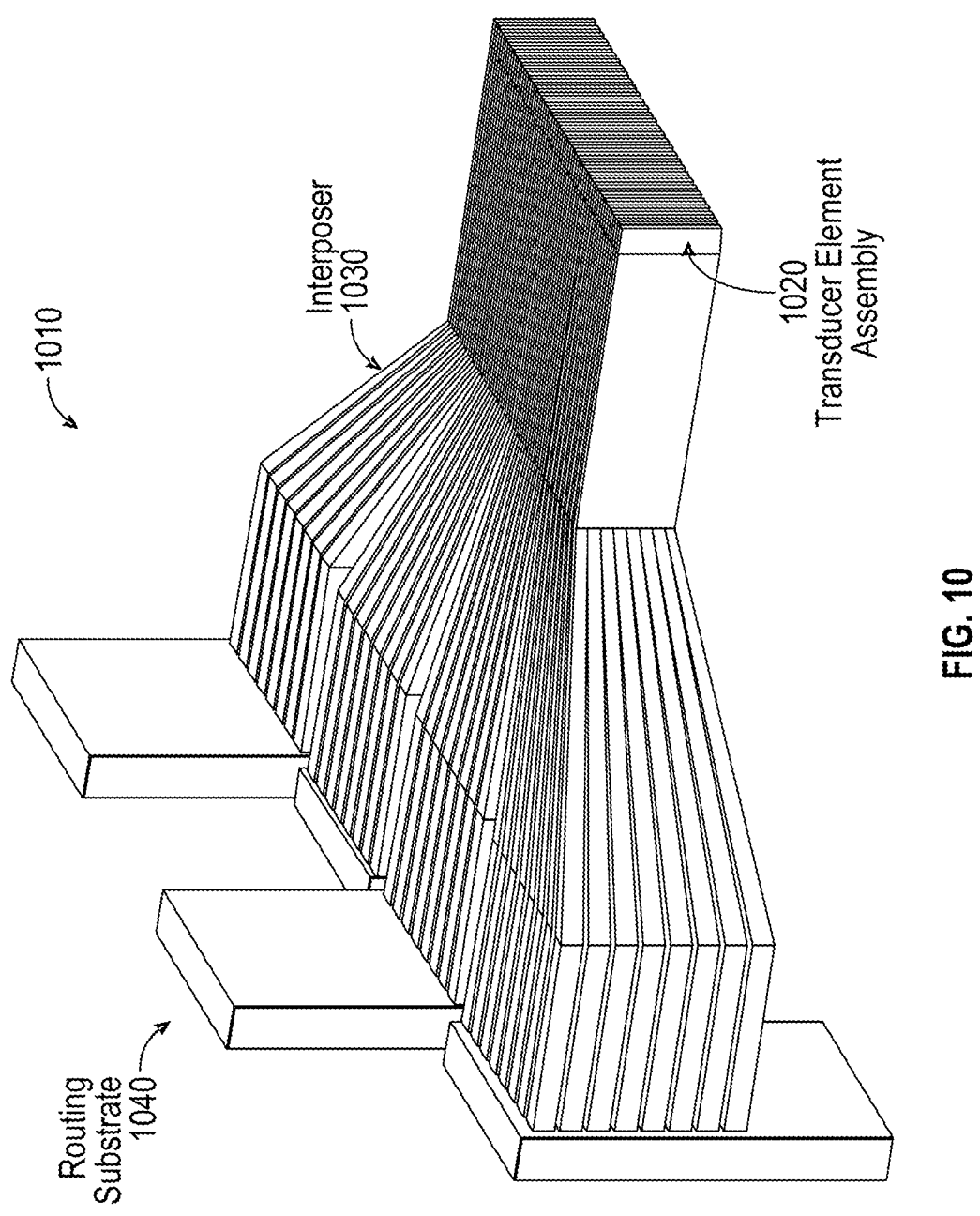
FIG. 10 is a perspective view of an example imaging module, in accordance with various embodiments.

As stated above, in an example embodiment, the imaging system further comprises an imaging module. With reference now to FIG. 10, an imaging module 1010 may further comprise a 2D transducer element assembly 1020, an intervening pitch-changing backing interposer assembly 1030, and a high-density routing substrate 1040. The transducer elements of transducer element assembly 1020 may have a pitch in the range of 150 μm down to as small as 5 μm depending on the operating frequency of the array. In an example embodiment, this pitch is expanded by the pitch-changing interposer 1030 so that a larger pitch is accommodated at the interconnect to the routing substrate 1040. In so doing, a difficult interconnection challenge at the transducer element interface is substituted for by a relatively more relaxed interconnection between the base of the interposer 1030 and the routing substrate 1040. Thus, imaging module 1010 may comprise a 2D array of elements at very fine pitch for high frequency and therefore high-resolution imaging.

Figure 11:
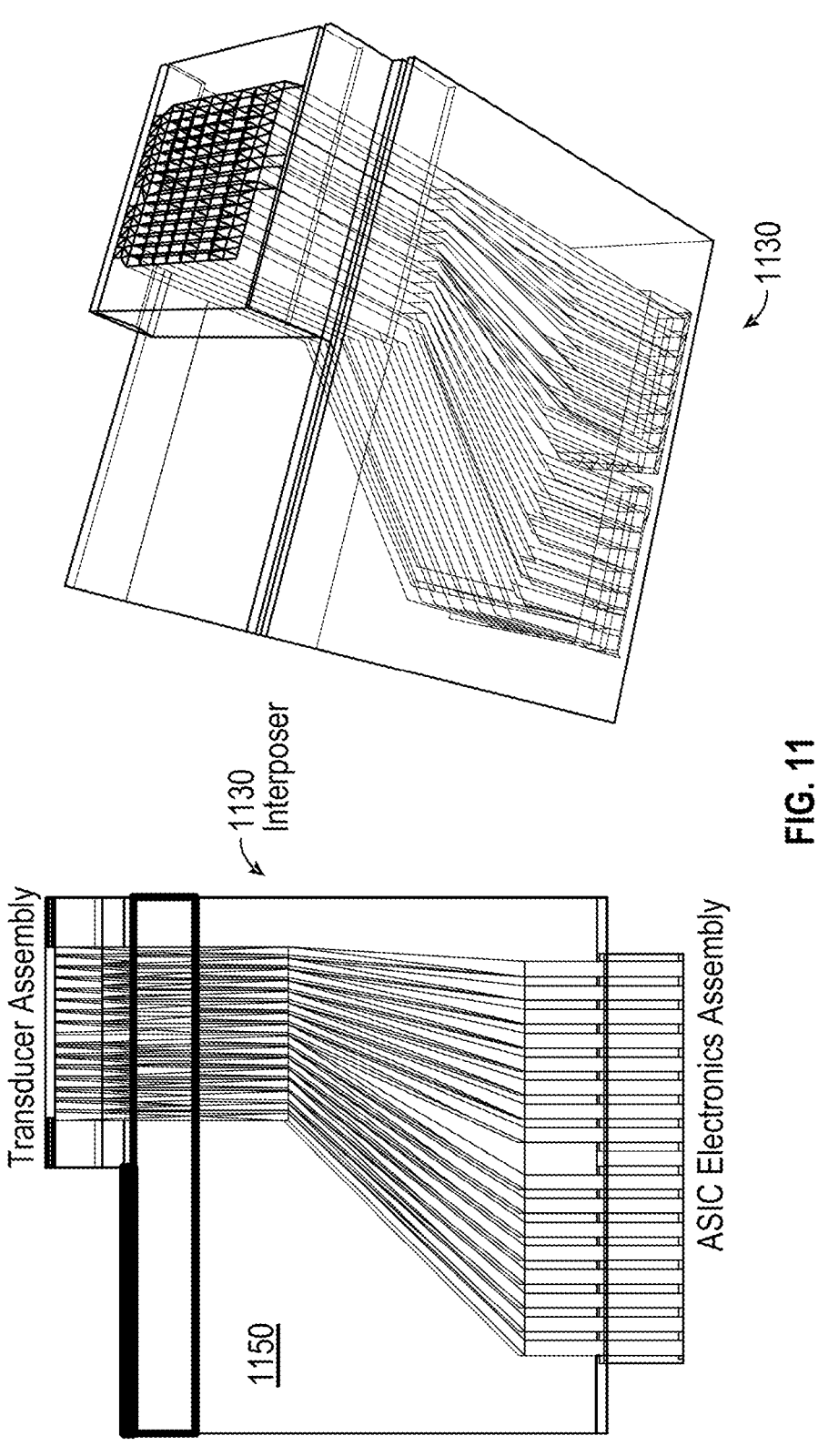
FIG. 11 illustrates plan and perspective views of an interposer of an imaging module, in accordance with various embodiments.

With reference now to FIG. 11, in an example embodiment, the interposer 1130 may comprise a grid of tubes embedded in a solid block of material 1150. These tubes may be filled using a conducting epoxy which is also acoustically attenuating. In an example embodiment, the structure thereby serves both as an interconnect and acoustic backing. This structure 1150 may be created by 3D printing using a micro-resolution capable acrylic printer to print the block of material with tubes in it or by injection molding. In an example embodiment, the pitch-changing structure of the interposer comprises a fine spacing of the transducer elements at the transducer side linked to a more coarse spacing of interconnections at the electronics assembly side.

Figures 12, 13:
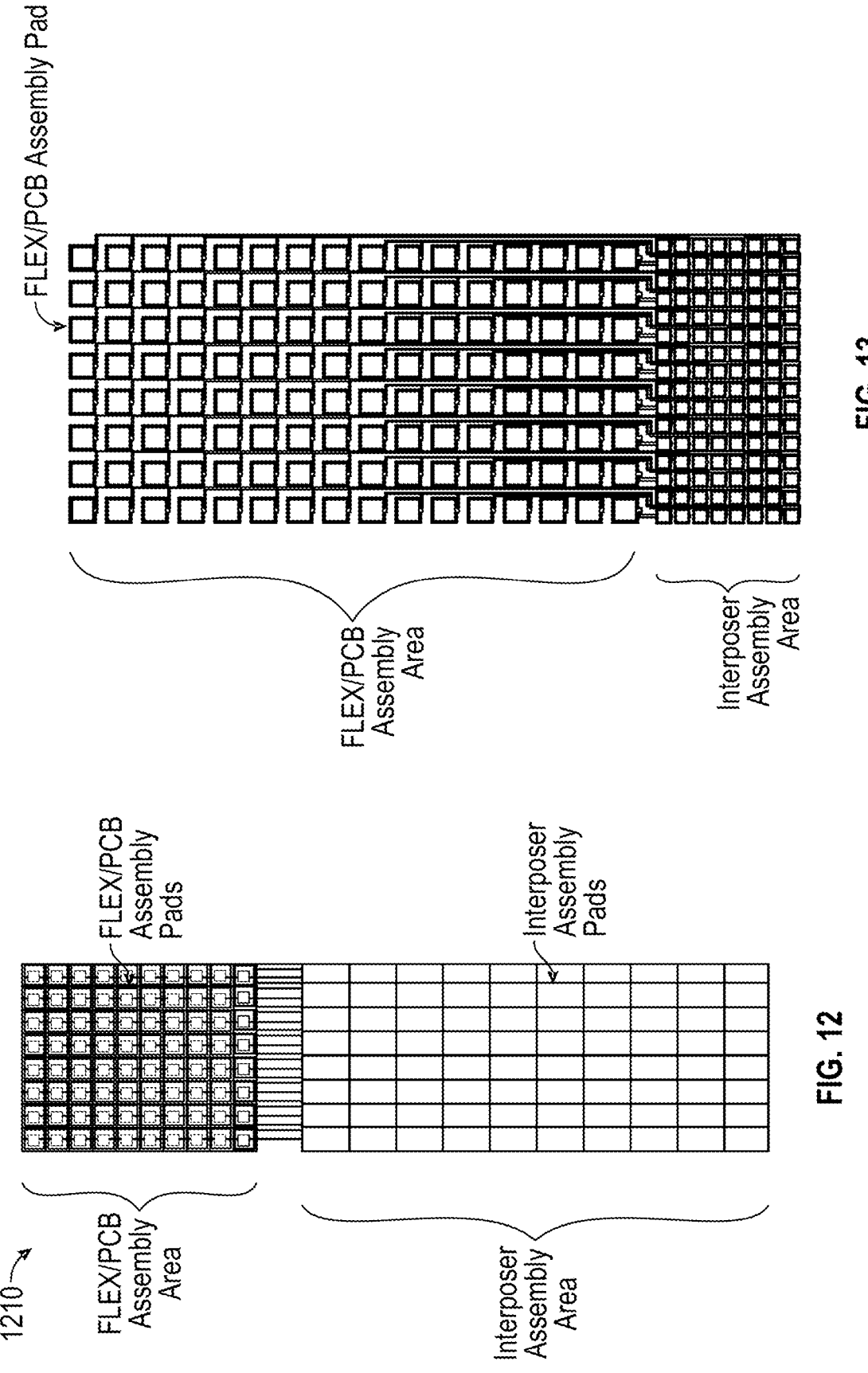
FIG. 12 is a top view of a component of an imaging module, in an example embodiment.
FIG. 13 is a top view of a conducting substrate of an imaging module, in an example embodiment.

With reference now to FIGS. 12 and 13, in an example embodiment, the imaging module 1010 further comprises a routing substrate 1210. In an example embodiment, the routing substrate comprises two distinct arrays of assembly pads with differing size and pitch. A first assembly area is designed to interface with the pitch-changing interposer, while a second assembly area is designed to interface to a flexible printed circuit (FLEX/FPC) or printed circuit board (PCB). The center-to-center pitch of the assembly pads in the interposer assembly pad area may be larger (FIG. 12 or smaller (FIG. 13) than the center-to-center pitch of the assembly pads in the FLEX/PCB assembly pad area. In this way efficient interconnection of the interposer to the FLEX/PCB is realized and a routing bottleneck due to the mismatch of assembly area size can be accommodated.

The routing substrate of FIG. 12 may be preferably constructed using a semiconductor processing CMOS, SOI, or BCDMOS Back End of Line (BEOL) process. It may further be constructed using High or Low Temperature Cofired Multilayer Ceramics (HTCC, or LTCC), or using a glass substrate. It may also be constructed using an organic build-up process or a High-Density Interconnect (HDI) process. In a further embodiment, the routing substrate contains Thru-Silicon (TSV) or Thru-Glass (TGV) vias that bring signals from the front side to the backside in the interposer assembly area or in the FLEX/PCB assembly area, or both.

Figure 14:
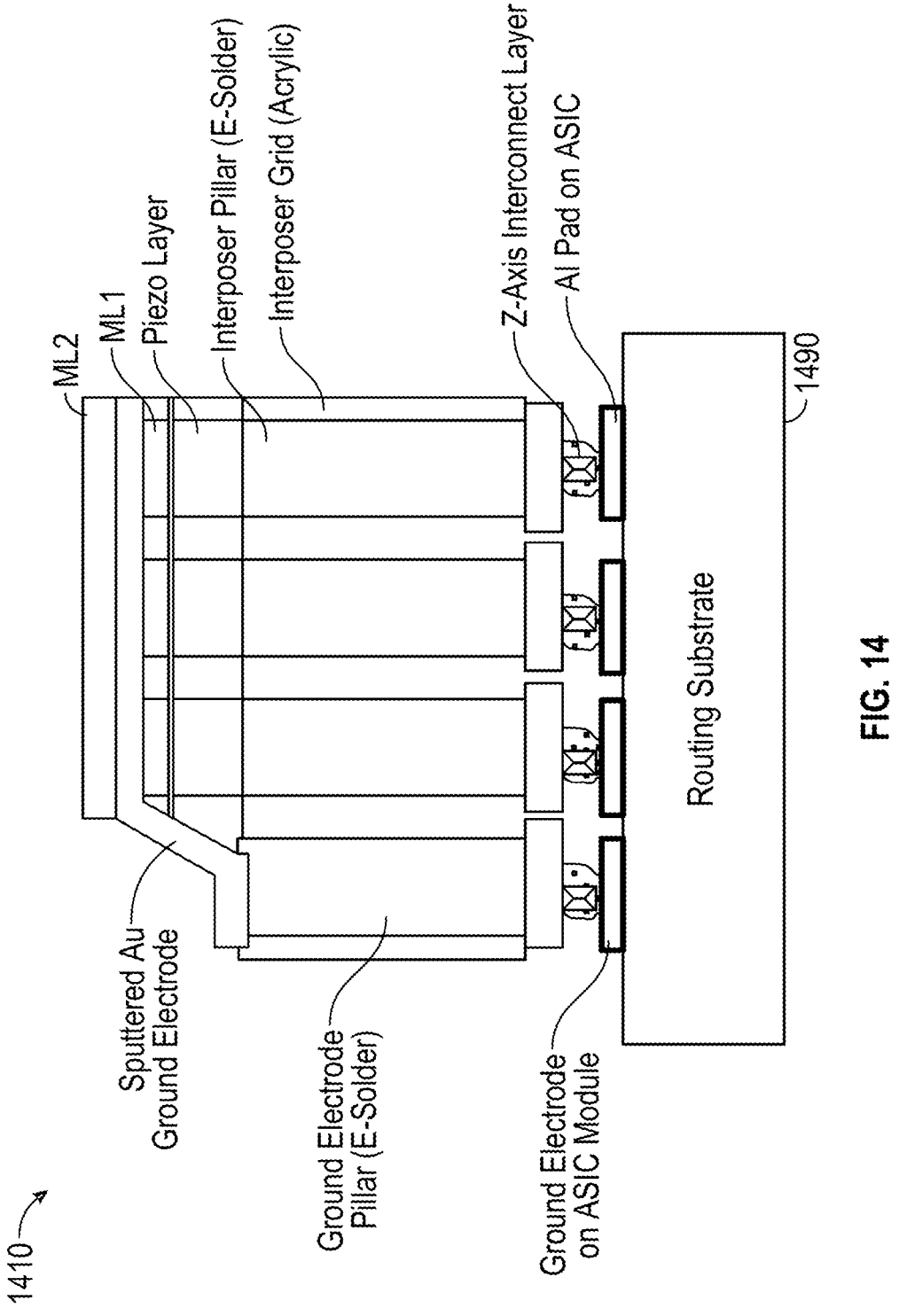
FIG. 14 is a side section view of an imaging module, in another example embodiment.

With reference now to FIG. 14, a side view cross-section of an example imaging module 1410 is illustrated. In this example embodiment, the imaging module 1410 comprises acoustic matching layers (ML1, and ML2), with a ground electrode therebetween. In an example embodiment, the ground electrode is sputtered gold, though any suitable conducting material may be used for the ground electrode.

In an example embodiment, the imaging module 1410 further comprises an acoustic piezoelectrically active layer under the ground electrode. In an example embodiment the piezoelectrically active layer may comprise any of the following technologies, including PZT, LiNbO3, Single-Crystal PIN-PMN-PT or PMN-PT materials, lead free piezoelectric materials, micro-machined pMUT or cMUT arrays, and 1-3 and 2-2 composites. In accordance with other example embodiments, the plurality of transducers may include Lead Zirconate Titanate (PZT) transducers, Single Crystal transducers, Piezoelectric Micromachined Ultrasonic Transducers (pMUTs) or Capacitive Micromachined Ultrasonic Transducers (cMUTs) and that are configured to emit ultrasonic energy to image the biological material in the cavity of each well. In an example embodiment, the plurality of ultrasonic transducers are arranged in a two-dimensional (2D) array to perform volumetric imaging. In an example embodiment, the ultrasound sensors comprise pMUTs or cMUTs. Moreover, any suitable piezoelectric materials may be used.

Next, imaging module 1410 comprises an interposer pillar under the piezoelectric layer. Then, in an example embodiment, the imaging module 1410 comprises an interposer grid under the interposer pillar. The interposer grid may comprise a 2D array routing the transducer assembly portion of the imaging module 1410 to a routing substrate 1490.

In an example embodiment, the interposer may be formed of an acrylic grid and conductive epoxy pillars. The acoustic layer (E.G. piezo composite) may be connected to the interposer using an Isotropic Conducting Epoxy (ICA) with elements being defined by mechanical or laser dicing, or isotropic etching of kerfs between elements. The acoustic layer may also be assembled to the interposer using an Anisotropic Conducting Epoxy (ICA) with elements being pad-defined. The acoustic assembly with the interposer may further be assembled to the routing substrate by a z-axis interconnect layer. Moreover, any suitable materials and acoustic layer techniques may be used.

In one example embodiment, the imaging module 1410 further comprises a Z-Axis interconnect layer. The Z-Axis interconnect layer may comprise Anisotropic Conductive Epoxy (ACA), or Anisotropic Conductive Film (ACF). Moreover, any suitable materials may be used for the Z-Axis interconnect layer. For example, the Z-Axis interconnect layer may also be created using gold stud bumps on the surface of the routing substrate. In another example embodiment, the Z-Axis interconnect layer may comprise copper pillars grown through semiconductor processing on the routing substrate 1490. The interposer may be secured to the surface of the routing substrate with a nonconducting underfill epoxy, or the Z-Axis interconnect layer may consist of printed or dispensed drops of Isotropic Conducting Adhesive (ICA). The interposer may also be bonded to the surface of the high-density routing substrate using a gold to gold thermocompression bond. In a further embodiment of the invention, the Z-Axis interconnect layer consists of an array of conducting spikes which are created as part of a 3D printing process which is also used to create the routing substrate 1490 itself.

Figures 15A, 15B:
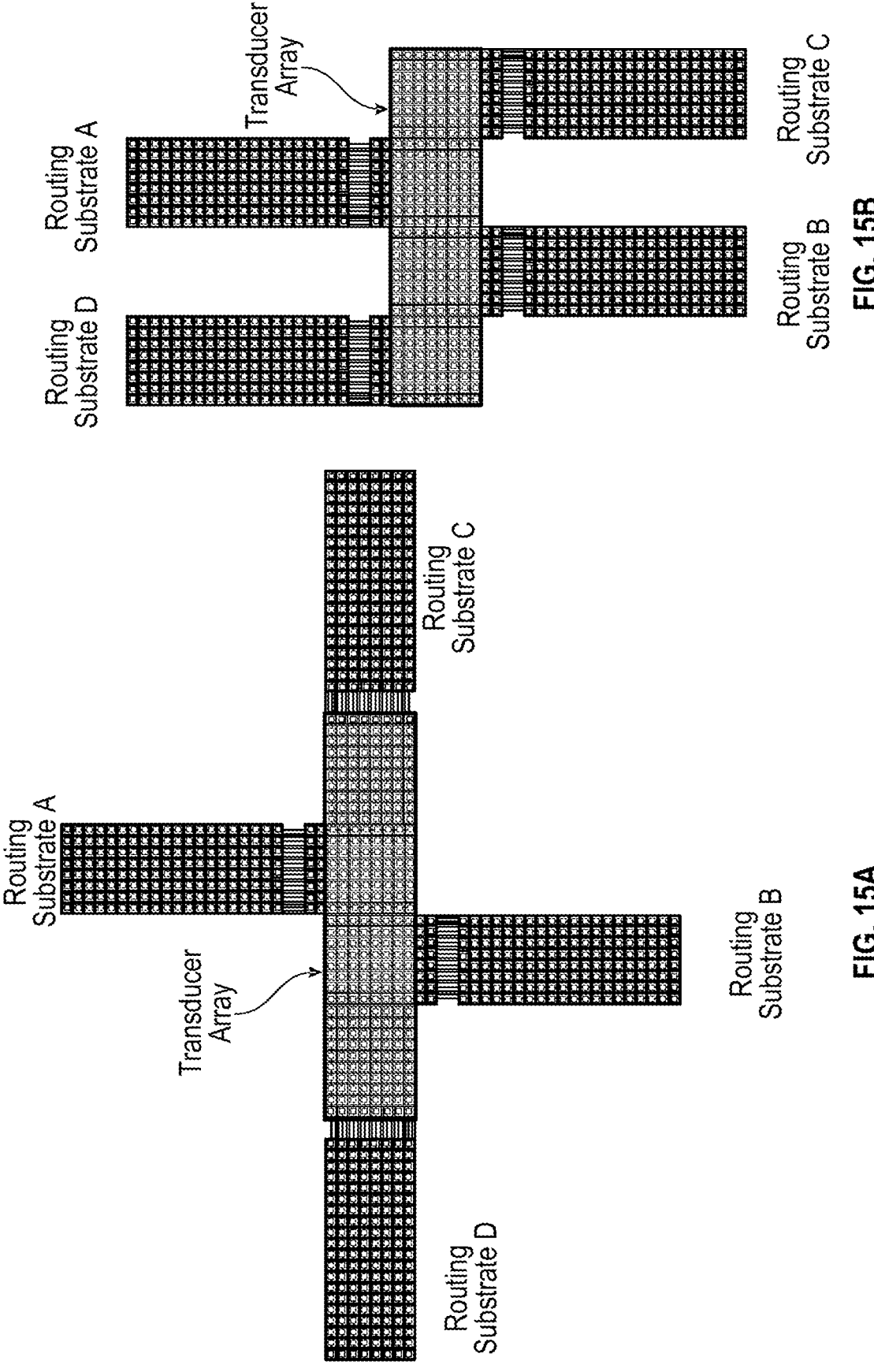
FIGS. 15A and 15B illustrate example combined imaging modules for a transducer, in accordance with an example embodiment.

With reference now to FIGS. 15A and 15B, multiple modules from FIG. 13A, may be tiled together to create a larger element count array. In each of FIGS. 15A and 15B, four modules are tiled together. However, any suitable number of modules can be tiled together. In an example embodiment, the particular arrangement of the modules shown in FIGS. 15A and 15B greatly facilitates breaking out the connections of the routing substrate FLEX/PCB assembly pads to the FLEX/PCB.

Figure 16:
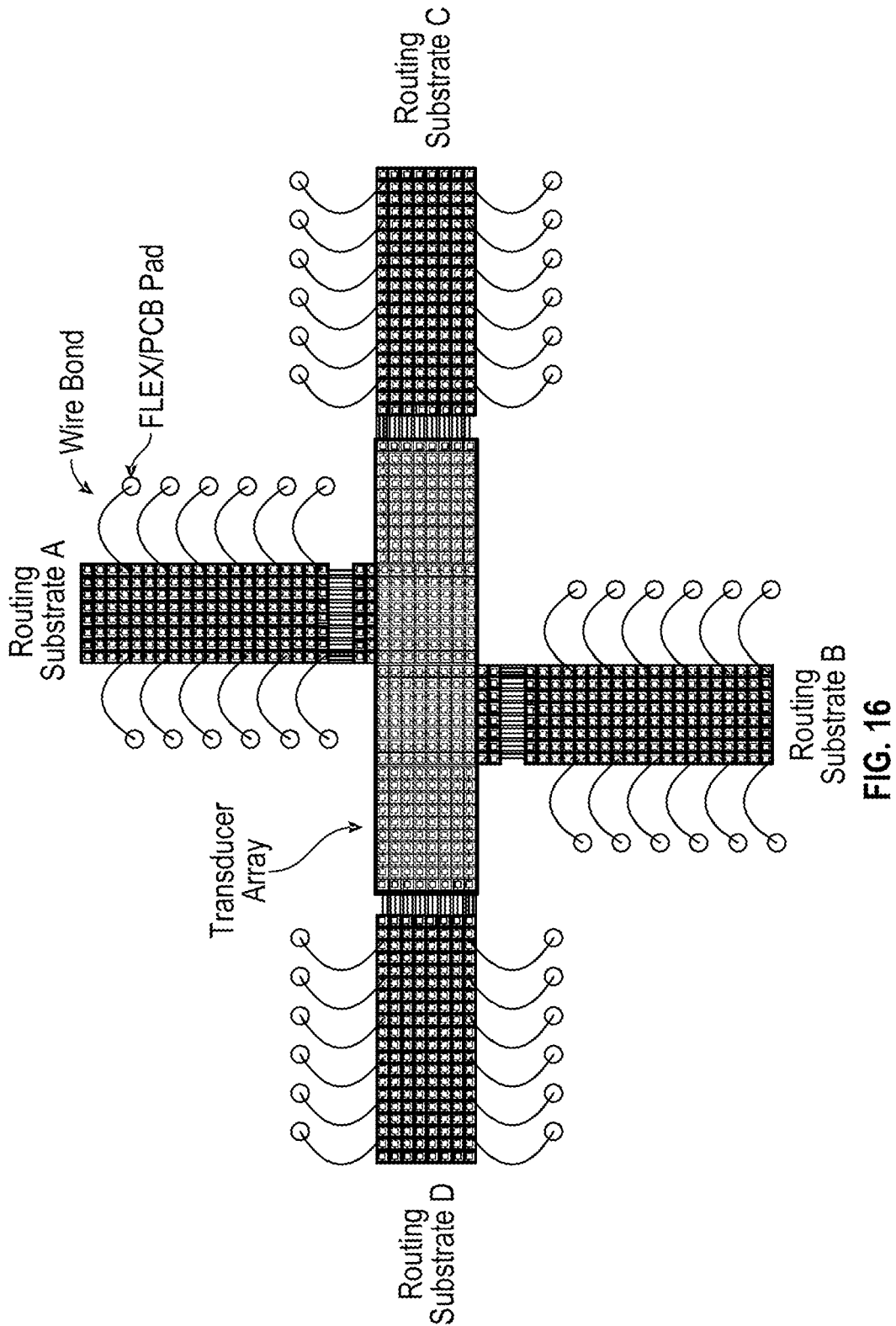
FIG. 16 illustrates example wire-bonding of the embodiment of FIG. 15A, in accordance with various embodiments.

This advantage is illustrated in FIG. 16, where Routing Substrate A is shown with a series of wire-bonds that connect the pads on the routing substrate to respective pads on the FLEX/PCB. The particular arrangement of the Routing Substrates A, B, C and D with respect to each other provides significant free area around the individual respective routing substrate pad arrays for breaking out the interconnect between those pads and connections on the FLEX/PCB.

Figure 17:
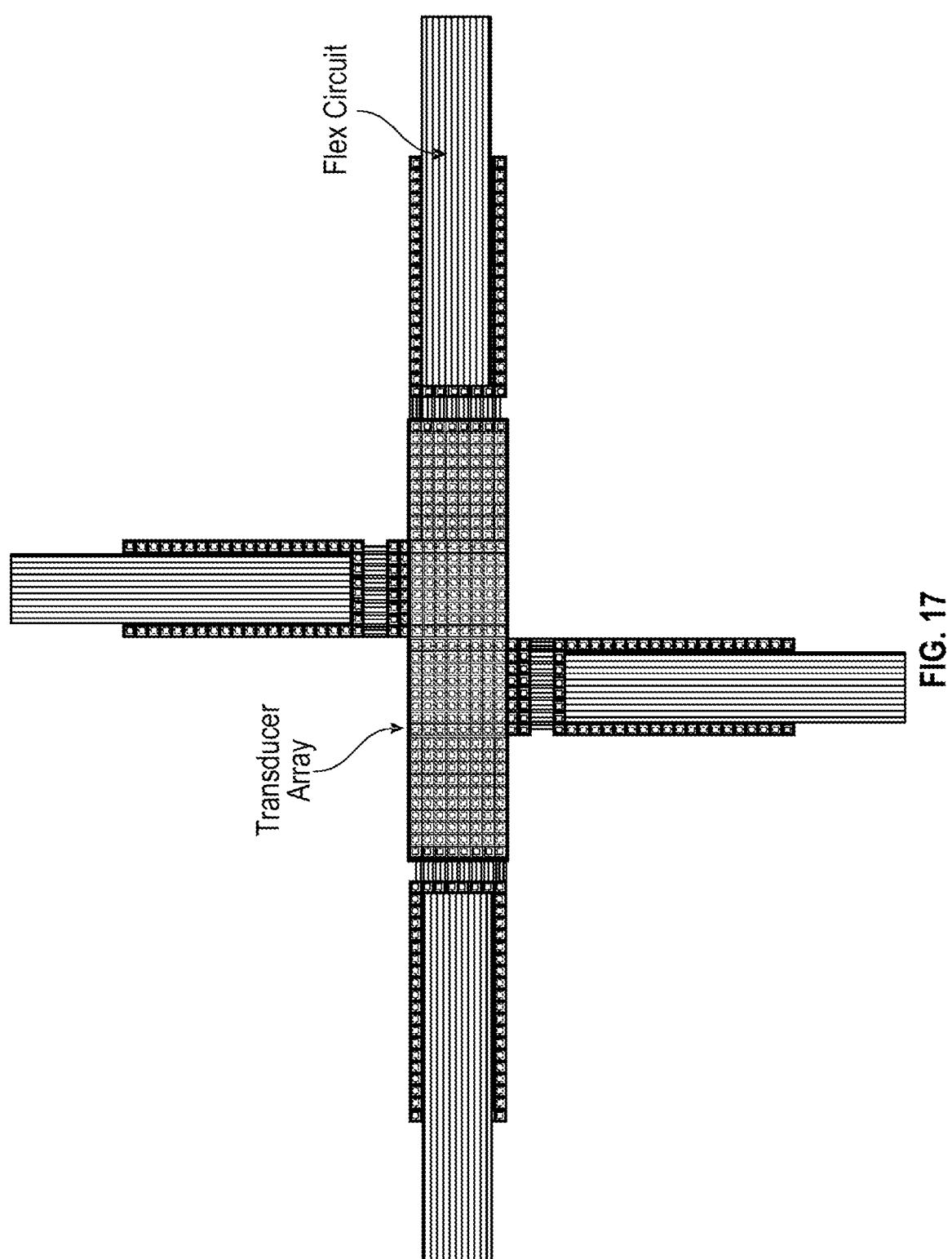
FIG. 17 is an alternate example of combined imaging modules connected to the next level of the system, in accordance with various embodiments.
Figure 18:
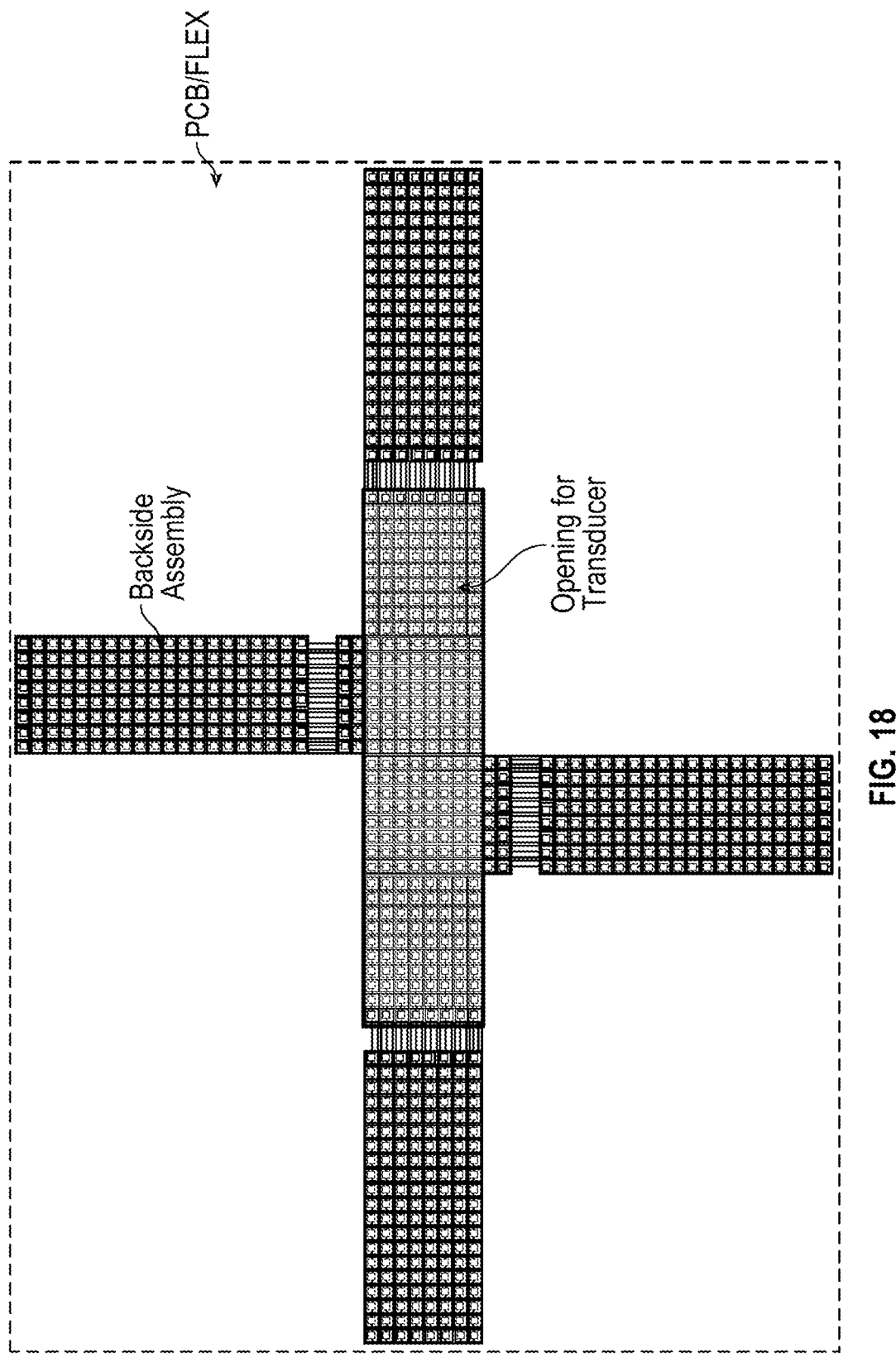
FIG. 18 is another example of combined imaging modules connected to the next level of the system, in accordance with various embodiments.

A further example embodiment is illustrated in FIG. 17, where the interconnect to the routing substrate pads is accomplished by flip-chip assembly of a flex circuit directly to the pads themselves. In another example embodiment illustrated in FIG. 18, the routing substrates are assembled to the backside of the PCB/FLEX circuit by flip-chip assembly and the PCB/FLEX substrate itself has a cut out opening window for the transducer array.

Moreover, in various example embodiments, the routing substrate may itself contain active electronics. These could be any combination of high voltage and low voltage circuitry for transmit and receive processing of ultrasound signals. In a further example embodiment, the routing substrate may further comprise local digital or analog beamforming signal capability. The arrays may be further configured to implement reduced channel beamforming architectures such as row-column and sparsely populated arrays and may further include local multiplexing and grouping of the element channels as well as signal buffering.

The arrays themselves may further implement full $\lambda/2$ pitch acoustic elements capable of 3D volume acquisition by phased-array steering in both azimuthal planes. In another example embodiment, the arrays may instead implement $\lambda$ (or greater) pitch element arrays for 1.75D, 1.5D, or 1.25D type scanning linear arrays with improved elevational focusing.

Thus, in an example embodiment, the imaging module includes a high-density routing substrate, a low-density routing board and an acoustically attenuating interposer in between the plurality of ultrasonic transducers and the high-density routing substrate. In an example embodiment, the acoustically attenuating interposer has a top side with a first pitch and a bottom side with a second pitch that is different than the first pitch. In an example embodiment, the high-density routing substrate has a first plurality of assembly pads coupled to the acoustically attenuating interposer and a second plurality of assembly pads coupled to the low-density routing boards, wherein the first plurality of assembly pads and the second plurality of assembly pads have different sizes and pitches. In an example embodiment, the high-density routing substrate is coupled to the low-density routing board using wire-bonding or a flip-chip assembly. In an example embodiment, the acoustically attenuating interposer is coupled to the high-density routing substrate using a first layer of an anisotropic conducting adhesive or film and the plurality of ultrasonic transducers are coupled to the acoustically attenuating interposer using a second layer of the anisotropic conducting adhesive or film. In an example embodiment, the high-density routing substrate is a three-dimension (3D) printed flexible circuit that has an array of elevated or metalized bumps. In an example embodiment, the acoustically attenuating interposer is coupled to the high-density routing substrate using a plurality of copper pillars integrated on a surface of the high-density routing substrate. In an example embodiment, the high-density routing substrate has a plurality of circuits that are configured to perform amplification, multiplexing or micro-beamforming.

One or more of the components of the system 100 may include software, hardware, a platform, app, micro-app, algorithms, modules, etc. The app may operate on any platform such as, for example, the IOS or Android platforms. The system 100 may utilize artificial intelligence. In accordance with various example embodiments, output and/or obtaining of the output may be trained by the use of artificial intelligence, machine learning and other algorithms. Training may involve the use of data from a large specimen population, and this data can be processed to adjust the ultrasound frequency and signal intensity to optimize the imaging process for a particular cohort of biological specimens.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any or any combination of programming or scripting languages such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, NY) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFOR- MIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a removable memory chip (such as an erasable programmable read only memory (EPROM), programmable read only memory (PROM)) and associated socket, or other removable storage units and interfaces, which allow software and data to be transferred from the removable storage unit to a computer system.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE CHROME™ software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, Apache Cassandra®, HBASE® by APACHE®, Map®-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Any communication, transmission, and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.), a uniform resource locator ("URL"), a document (e.g., a MICROSOFT® Word or EXCEL™, an ADOBE® Portable Document Format (PDF) document, etc.), an "ebook," an "emagazine," an application or microapplication (as described herein), an short message service (SMS) or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for purposes of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An imaging system, comprising:
a multi-well assay plate having a plurality of wells, each well of the plurality of wells defining a cavity that is configured to hold a biological material;
an imaging module comprising a plurality of transducers, a high-density routing substrate, a low-density routing board, and an acoustically attenuating interposer in between the plurality of transducers and the high-density routing substrate; and
a processor coupled to the imaging module and configured to:
activate the plurality of transducers to emit energy within the plurality of wells to stimulate the biological material, and
generate an image of or analyze the biological material within each well.

2. The imaging system of claim 1, further comprising:
a power source coupled to the imaging module and configured to power the imaging module;
a memory configured to store image data or analyzed data; and
a display configured to display the image.

3. The imaging system of claim 1, further comprising:
at least one of an optical imaging device, a laser configured to stimulate photoacoustic signals, a heating unit or a three-dimensional (3D) printer.

4. The imaging system of claim 1, wherein the imaging module includes a plurality of imaging modules that are arranged in a single row on a mechanical translating bar or head, wherein the processor is configured to:
cause the mechanical translating bar or head to slide, move or translate in one or more directions across a top plate with acoustically transparent protrusions coupled to a top surface of liquid medium within the plurality of wells to image the biological material within the plurality of wells when the plurality of imaging modules are activated.

5. The imaging system of claim 4, wherein the plurality of transducers of each imaging module of the plurality of imaging modules are in a linear array and acoustically focused in elevation using a physical acoustic lens.

6. The imaging system of claim 1, wherein the imaging module is an acoustic or electric module, wherein the acoustic or electric module is positioned and coupled to a bottom surface of a well of the plurality of wells of the multi-well assay plate.

7. The imaging system of claim 1, wherein the imaging module is an acoustic or electric module, wherein the acoustic or electric module is coupled to an acoustic coupling layer intervening between the imaging module and a bottom surface of a well of the plurality of wells of the multi-well assay plate.

8. The imaging system of claim 1, wherein the imaging module is an acoustic or electric module, wherein the acoustic or electric module is positioned and coupled integrated in opposing pairs at two or more sidewalls of the well, and the acoustic or electric module is configured to acquire speed of sound measurements or tomography measurements.

9. The imaging system of claim 2, further comprising:
an enclosure having a lid that is movable between an open position and a closed position and is configured to receive the multi-well assay plate when the lid is in the open position;
wherein the processor is coupled to the multi-well assay plate when loaded within the enclosure and is configured to:
communicate with the imaging module using at least one of an electrical connection, a radio frequency device or an optical device; and
analyze the image data.

10. The imaging system of claim 1, wherein an acoustically attenuating interposer has a top side with a first pitch and a bottom side with a second pitch that is different than the first pitch.

11. The imaging system of claim 1, wherein the high-density routing substrate has a first plurality of assembly pads coupled to the acoustically attenuating interposer and a second plurality of assembly pads coupled to the low-density routing boards, wherein the first plurality of assembly pads and the second plurality of assembly pads have different sizes and pitches.

12. The imaging system of claim 1, wherein the high-density routing substrate is coupled to the low-density routing board using wire-bonding or a flip-chip assembly.

13. The imaging system of claim 1, wherein the acoustically attenuating interposer is coupled to the high-density routing substrate using a first layer of an anisotropic conducting adhesive or film and the plurality of transducers are coupled to the acoustically attenuating interposer using a second layer of the anisotropic conducting adhesive or film.

14. The imaging system of claim 1, wherein the high-density routing substrate is a three-dimension (3D) printed flexible circuit that has an array of elevated or metalized bumps.

15. The imaging system of claim 1, wherein the acoustically attenuating interposer is coupled to the high-density routing substrate using a plurality of copper pillars integrated on a surface of the high-density routing substrate.

16. The imaging system of claim 1, wherein the high-density routing substrate has a plurality of circuits that are configured to perform amplification, multiplexing or micro-beamforming.

17. The imaging system of claim 1, wherein the imaging module includes a plurality of imaging modules that are arranged in a single row on a mechanical translating member, and wherein the processor is configured to cause the mechanical translating member to translate in one or more directions across a bottom plate that is acoustically coupled to the bottom of the multi-well assay plate to image the biological material within the plurality of wells when the plurality of imaging modules are activated.

18. The imaging system of claim 7, wherein the acoustic or electric module is further coupled to a positioning system which is used to position the module to scan each of the wells in the well plate in succession.

19. The imaging system of claim 7, wherein the acoustic or electric module is further coupled to a positioning system which is used to position the module to scan each row of wells in the well plate in succession.

20. The imaging system of claim 1, wherein the imaging module is an acoustic/electronic module.

21. The imaging system of claim 20, wherein the imaging module is an acoustic module comprising an array of acoustic transducers interfaced to a next level of the system using an array of wires.

22. The imaging system of claim 20, wherein the imaging module is an electronic module comprising an array of acoustic transducers interfaced to front-end electronics which in turn are interfaced to a next level of the system via an array of wires.

23. An imaging system, comprising:

a multi-well assay plate having a plurality of wells, each well of the plurality of wells defining a cavity that is configured to hold a biological material;

an imaging module comprising a plurality of transducers, a routing substrate, and an acoustically attenuating interposer in between the plurality of transducers and the routing substrate; and a processor coupled to the imaging module and configured to:

activate the plurality of transducers to emit energy within the plurality of wells to stimulate the biological material, and generate an image of or analyze the biological material within each well.

\*   \*   \*   \*   \*